United States Patent
Wakabayashi

(10) Patent No.: US 9,596,683 B2
(45) Date of Patent: Mar. 14, 2017

(54) ALLOCATING TRANSMISSION RESOURCES TO MTC-TYPE TERMINALS

(71) Applicant: SONY CORPORATION, Tokyo (JP)

(72) Inventor: Hideji Wakabayashi, Reading (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/414,830

(22) PCT Filed: Aug. 29, 2013

(86) PCT No.: PCT/GB2013/052273
§ 371 (c)(1),
(2) Date: Jan. 14, 2015

(87) PCT Pub. No.: WO2014/049326
PCT Pub. Date: Apr. 3, 2014

(65) Prior Publication Data
US 2015/0181603 A1 Jun. 25, 2015

(30) Foreign Application Priority Data
Sep. 28, 2012 (GB) .................................. 1217410.8

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0041* (2013.01); *H04L 5/0092* (2013.01);
(Continued)

(58) Field of Classification Search
CPC ......... H04W 72/0453; H04W 72/0486; H04W 72/00; H04W 72/04; H04W 72/048;
(Continued)

(56) References Cited

U.S. PATENT DOCUMENTS 6,751,444 B1 * 6/2004 Meiyappan ......... H04W 52/367
340/7.4
2005/0180374 A1 8/2005 Balachandran et al.
(Continued)

FOREIGN PATENT DOCUMENTS

GB 2487757 A 8/2012
GB 2487780 A 8/2012
(Continued)

OTHER PUBLICATIONS

Huawei, et al., "Recommendation for bandwidth reduction," 3GPP Draft, R1-121708, vol. RAN WG1, No. Jeju, Korea, XP050600066, Mar. 2012, pp. 1-6.
(Continued)

*Primary Examiner* — Warner Wong
(74) *Attorney, Agent, or Firm* — Oblon, McClelland, Maier & Neustadt, L.L.P.

(57) ABSTRACT

An apparatus and method for allocating transmission resources to MTC-type terminals and transmitting data in mobile telecommunication systems in dependence upon the capability of the RF receiver equipment of those terminals. Where a virtual carrier is established to carry data for a given MTC-type device, the position of the center frequency for that virtual carrier is assigned on the basis of both the capability of the RF receiver equipment of that terminal and the degree of traffic congestion on the frequency band at which the virtual carrier has been established.

19 Claims, 22 Drawing Sheets

(51) Int. Cl.
*H04L 27/26* (2006.01)
*H04W 4/00* (2009.01)

(52) U.S. Cl.
CPC ........ *H04L 5/0094* (2013.01); *H04L 27/2627* (2013.01); *H04W 72/048* (2013.01); *H04W 72/0486* (2013.01); *H04L 5/0064* (2013.01); *H04L 5/0096* (2013.01); *H04W 4/005* (2013.01)

(58) Field of Classification Search
CPC . H04W 28/0284; H04W 28/06; H04W 28/08; H04W 28/085; H04W 36/22; H04W 72/12; H04L 27/2627; H04L 5/0041
See application file for complete search history.

(56) References Cited

U.S. PATENT DOCUMENTS

| | | | | |
|---|---|---|---|---|
| 2008/0212532 | A1* | 9/2008 | Heo | H04B 1/7143 370/330 |
| 2009/0154584 | A1* | 6/2009 | Kishiyama | H04L 5/0007 375/260 |
| 2010/0008311 | A1* | 1/2010 | Oh | H04W 16/02 370/329 |
| 2010/0027492 | A1* | 2/2010 | Asanuma | H04L 5/0007 370/329 |
| 2012/0320860 | A1* | 12/2012 | Chun | H04L 5/003 370/329 |
| 2013/0128816 | A1* | 5/2013 | Li | H04W 28/20 370/328 |
| 2013/0156005 | A1* | 6/2013 | Li | H04L 5/001 370/331 |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2491859 A | 12/2012 |
| GB | 2493703 A | 2/2013 |
| WO | 2012/104634 A1 | 8/2012 |

OTHER PUBLICATIONS

ETSI TS 122 368 V10.5.0 / 3GPP TS 22.368 version 10.5.0 Release 10, "Digital cellular telecommunications system (Phase 2+); Universal Mobile Telecommunications System (UMTS); LTE; Service requirements for Machine-Type Communications (MTC); Stage 1," Jul. 2011, cover page and pp. 1-17.

R. Svitek, et al., "DC Offsets in Direct-Conversion Receivers: Characterization and Implications," http://venividiwiki.ee.virginia.edu/mediawiki/images/9/93/DCR_Raman.pdf, IEEE Microwave Magazine, Sep. 2005, pp. 76-86.

International Search Report issued Nov. 29, 2013 in PCT/GB2013/052273 filed Aug. 29, 2013.

United Kingdom Search Report issued Jan. 24, 2013 in GB1217410.8 filed Sep. 28, 2012.

* cited by examiner

| UE-EUTRA-Capability field descriptions |
|---|
| *accessStratumRelease*<br>Set to rel. 8 in this version of the specification. |
| *maxNumberROHC-ContextSessions*<br>Set to the maximum number of concurrently active ROHC contexts supported by the UE. CS2 corresponds with 2 (context sessions), CS4 corresponds with 4 and so on. |
| *ue-Category*<br>UE category as defined in TS36.306[5]. Set to values 1 to 5 in this version of this specification. |
| *bandEUTRA*<br>E-UTRA band as defined in TS 36.101 [42] |
| *UE-TXAntennaSelectionSupported*<br>TRUE indicates that the UE is capable of supporting UE transmit antenna selection as described in TS.36.213[23,8.7] |
| *halfDuplex*<br>If halfDuplex is set to true, only half duplex operation is supported for the band otherwise full duplex operation is supported. |
| *bandListEUTRA*<br>One entry corresponding to each supported E-UTRA band listed in the same order as in *supportedBandListEUTRA*. |
| *InterFreqBandList*<br>One entry corresponding to each supported E-UTRA band listed in the same order as in *supportedBandListEUTRA*. |
| *InterFreqNeedForGaps*<br>Indicates need for measurement gaps when operating on the E-UTRA band given by the entry in *bandListEUTRA* and measuring on the E-UTRA band given by the entry in *interFreqBandList* |

FIG. 13B

*InterRAT-BandList*
One entry corresponding to each supported band of another RAT listed in the same order as in the *interRAT-Parameters*

*InterRATNeedFor Gaps*
Indicates need for DL measurement gaps when operating on the E-UTRA band given by the entry in *bandListEUTRA* and measuring on the Inter-RAT band given by the entry in the *InterRAT-BandList*

*bandUTRA-FDD*
UTRA band as defined in TS 25.101 [17]

*bandUTRA-TDD128*
UTRA band as defined in TS 25.102 [18]

*bandUTRA-TDD384*
UTRA band as defined in TS 25.102 [18]

*bandUTRA-TDD768*
UTRA band as defined in TS 25.102 [18]

*bandGERAN*
GERAN band as defined in TS 45.005 [20]

*bandHRPD*
CDMA2000 HRPD band class

*band1XT*
CDMA2000 1xT band class

*featureGroupIndicators*
The definitions of the bits in the bit string are described in Annex B.

FIG. 13B (continued)

ALLOCATING TRANSMISSION RESOURCES TO MTC-TYPE TERMINALS

CROSS-REFERENCE TO RELATED APPLICATIONS

The present application claims priority to British Patent Application 1217410.8, filed in the UK IPO 28 Sep. 2012, the entire contents of which being incorporated herein by reference.

BACKGROUND OF THE INVENTION

The present invention relates to methods, systems and apparatus for allocating transmission resources and transmitting data in mobile telecommunication systems.

Embodiments of the present invention can for example allocate of transmission resources to machine type communication (MTC) devices in cellular telecommunications networks having orthogonal frequency division multiplex (OFDM) based radio access technology (such as WiMAX and LTE).

Certain classes of telecommunications device, such as MTC devices (e.g. semi-autonomous or autonomous wireless communication terminals), support "low capability" communication applications that are characterised, for instance, by the transmission of small amounts of data at relatively infrequent intervals.

In many scenarios, it is preferable to provide terminals dedicated to such "low capability" communication applications with a simple receiver unit (or transceiver unit) having capabilities more commensurate with the amount of data likely to be transmitted to (or from) the terminal. This more limited capability contrasts with the capabilities of the conventional mobile telecommunications terminals, such as smartphones, which share access to the same telecommunications networks.

To support MTC terminals, it has been proposed to introduce a "virtual carrier" operating within a bandwidth of one or more "host carriers": the proposed virtual carrier concept preferably integrates within the transmission resources of conventional OFDM based radio access technologies and subdivides frequency spectrum in a similar manner to OFDM. Unlike data transmitted on a conventional OFDM type downlink carrier, data transmitted on the virtual carrier can be received and decoded without needing to process the full bandwidth of the downlink OFDM host carrier. Accordingly, data transmitted on the virtual carrier can be received and decoded using a reduced complexity receiver unit: with concomitant benefits such as increased simplicity, increased reliability, reduced form-factor and lower manufacturing cost.

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

In one version of the virtual carrier concept a plurality of subcarriers are disposed at predetermined offsets from a central frequency, similar to the subcarrier structure in conventional OFDM: the central frequency may be viewed as characterising the whole virtual carrier. The virtual carrier central frequency is typically selected to be the central frequency of the host carrier.

Direct conversion receiver architectures are attractive for manufacturers of mass market communication devices, such as MTC devices, because of their simplicity and lower cost. The communications networks have therefore adapted their standards to permit the adoption of such architectures. One adaptation has been to stipulate that the standard should not use a frequency band where direct conversion receivers are likely to encounter disruptive levels of interference arising from imperfections in the receiver itself (i.e. self-mixing)—the unused frequency band is commonly referred to as the DC subcarrier, where DC stands for "direct current": non-use of a frequency band is typically achieved by not transmitting a carrier wave at the frequency band in downlink transmissions from a base station in the communications networks.

An efficient operation of a wireless telecommunications system for MTC devices is therefore desirable.

SUMMARY OF THE INVENTION

According to a first aspect of the invention there is provided a base station for communicating data with at least one terminal in a wireless telecommunications system using a first plurality of Orthogonal Frequency Division Multiplex, OFDM, sub-carriers spanning a first frequency bandwidth, at least one of said subcarriers being an unused centre frequency for the first frequency bandwidth, the base station being configured: to detect the bandwidth status of a receiver of the terminal; to assign a centre frequency for a virtual channel in accordance with said detected bandwidth status, the virtual channel being a group of sub-carriers selected from said first plurality of OFDM sub-carriers and spanning a second frequency bandwidth, said second frequency bandwidth being substantially narrower than the first frequency bandwidth; to allocate at least one unused subcarrier to said assigned centre frequency; and to communicate user-plane data with the terminal using the virtual channel.

If the terminal is determined to have a first bandwidth status, first bandwidth status representing an indication that the terminal has a receiver that can receive radio frequency, RF, signals over the first frequency bandwidth and baseband signals over the second frequency bandwidth, the centre frequency for the virtual channel may be assigned to a frequency substantially distinct from the centre frequency for the first frequency bandwidth and the at least one unused subcarrier allocated to the assigned centre frequency is the unused centre frequency for the first frequency bandwidth. The first bandwidth status may correspond to a baseband narrow band type of receiver architecture as described hereafter.

Alternatively or additionally, if the terminal is determined to have a second bandwidth status, second bandwidth status representing an indication that the terminal has a receiver that can receive radio frequency, RF, signals and baseband signals over the second frequency bandwidth, the centre frequency for the virtual channel may be assigned to the centre frequency for the first frequency bandwidth and the at least one unused subcarrier allocated to the assigned centre frequency is the unused centre frequency for the first frequency bandwidth. The second bandwidth status may correspond to a normal narrow band type of receiver architecture as described hereafter.

Conveniently, the base station may include a capacity monitoring unit for determining the level of data traffic on virtual channels, and in the case where both the level of data traffic in the virtual channel is determined to exceed a capacity threshold level and the terminal is determined to have a second bandwidth status, second bandwidth status representing an indication that the terminal has a receiver that can receive radio frequency, RF, signals and baseband signals over the second frequency bandwidth: the centre frequency for the virtual channel is assigned to a frequency substantially distinct from the centre frequency for the first frequency bandwidth, the base station is further configured to designate the assigned centre frequency as an unused centre frequency for the virtual channel; and the at least one unused subcarrier allocated to the assigned centre frequency is the designated unused centre frequency.

Preferably, the bandwidth status represents an indication of a classification of receiver architecture selected from a group including: intermediate frequency conversion, direct conversion, normal narrowband and baseband narrowband.

Alternatively or in addition, the bandwidth status may correspond to at least one parameter characterising the bandwidth size capability of the receiver. The bandwidth size capability may relate to the radio frequency capability and/or the baseband capability of the receiver.

The base station therefore provides an unused frequency band suitable for MTC devices with direct conversion receivers that are likely to encounter self-mixing. An example of a wireless telecommunications system to which the base station belongs is OFDM based LTE: the unused frequency band in LTE is a subcarrier at the central frequency of OFDM downlink host carrier (i.e. a subcarrier at the centre frequency of a downlink frequency band used by a telecommunication network with LTE). Thus the virtual carrier that shares a central frequency with the host carrier also has access to an unused frequency band and any MTC devices assigned to the virtual carrier can adopt direct conversion receivers for receiving RF signals without the risk of significant self-mixing.

While the base station may be used to provide radio access to both conventional wireless telecommunications systems and to virtual carriers within the transmission resources of these telecommunications systems, there are circumstances where the base station above is a dedicated MTC base station, operated in parallel with a conventional main base station. An dedicated MTC base station (offering a narrow band resource to MTC devices that can have restricted baseband bandwidth) is suitable for both DC and IF receiver architectures. Where devices of different receiver architectures and bandwidth status are present, an IF receiver architecture may be seen as preferable to DC receiver architecture, particularly if virtual carrier centre frequency is different from the host carrier centre frequency. This can be used to establish which base station ("conventional" or "dedicated MTC") should be used first by any given telecommunications terminal.

It has been seen as desirable to extend the concept of virtual carriers to blocks of OFDM subcarriers that are not centred on the host carrier central frequency. Co-pending patent application number GB 1113801.3 [11] describes one arrangement where there is a plurality of MTC devices and the central frequency of at least some of the virtual carriers is not same as the central frequency of the host carrier.

In this case, there is the risk that the central frequency assigned to the virtual carrier may not be free of data—and thus that MTC devices with direct conversion receiver architectures may encounter unwanted interference and consequently that they may operate less effectively in the virtual carrier.

The base station efficiently allocates an unused subcarrier (i.e. a DC subcarrier) to each terminal device using one or more resource blocks in virtual carrier mode (such as MTC devices) in accordance with the bandwidth capability of that terminal device. Depending upon the MTC device capabilities (i.e. bandwidth status) the central frequency of the virtual carriers need not be the same as the central frequency of the host carrier yet all MTC devices that might be affected by self-mixing may be assigned virtual carriers that have suitable "unused" central frequencies.

Whereas known virtual carrier arrangements does not take DC offset impact for direct conversion receivers into account when the virtual carrier central frequency is different from the host carrier central frequency, the solution described herein provides a set of solutions for DC subcarrier allocation for virtual carrier (especially in low cost MTC-type terminals) where a virtual carrier is allocated in groups of sub-carriers (i.e. resource blocks) other than those centred on the (LTE) host carrier centre frequency.

Various further aspects and embodiments of the invention are provided in the appended claims.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which:

FIG. 13B illustrates a conventional UE-EUTRA-Capability IE to which new IEs relevant to MTC-type devices may be appended;

DETAILED DESCRIPTION

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

Figure 1:
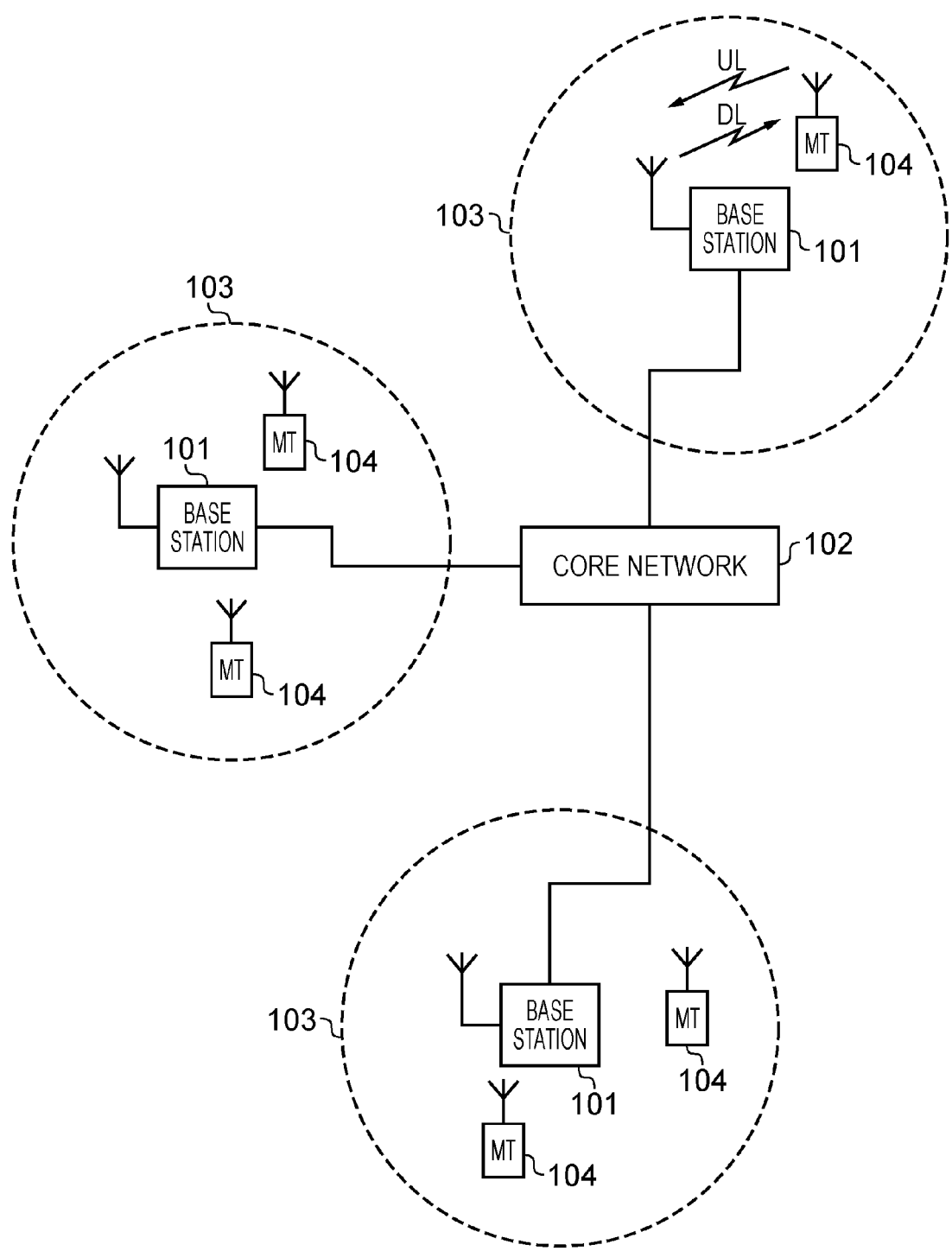
FIG. 1 provides a schematic diagram illustrating an example of a conventional mobile telecommunication network.

FIG. 1 provides a schematic diagram illustrating some basic functionality of a conventional mobile telecommunications network.

The network includes a plurality of base stations 101 connected to a core network 102. Each base station provides a coverage area 103 (i.e. a cell) within which data can be communicated to and from terminal devices (also referred to as mobile terminals, MT or User equipment, UE) 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
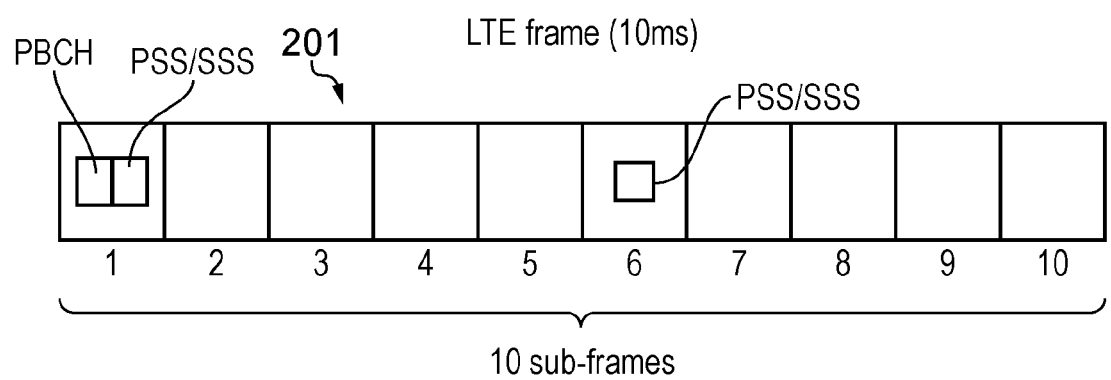
FIG. 2 provides a schematic diagram illustrating a conventional LTE radio frame.

FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3A:
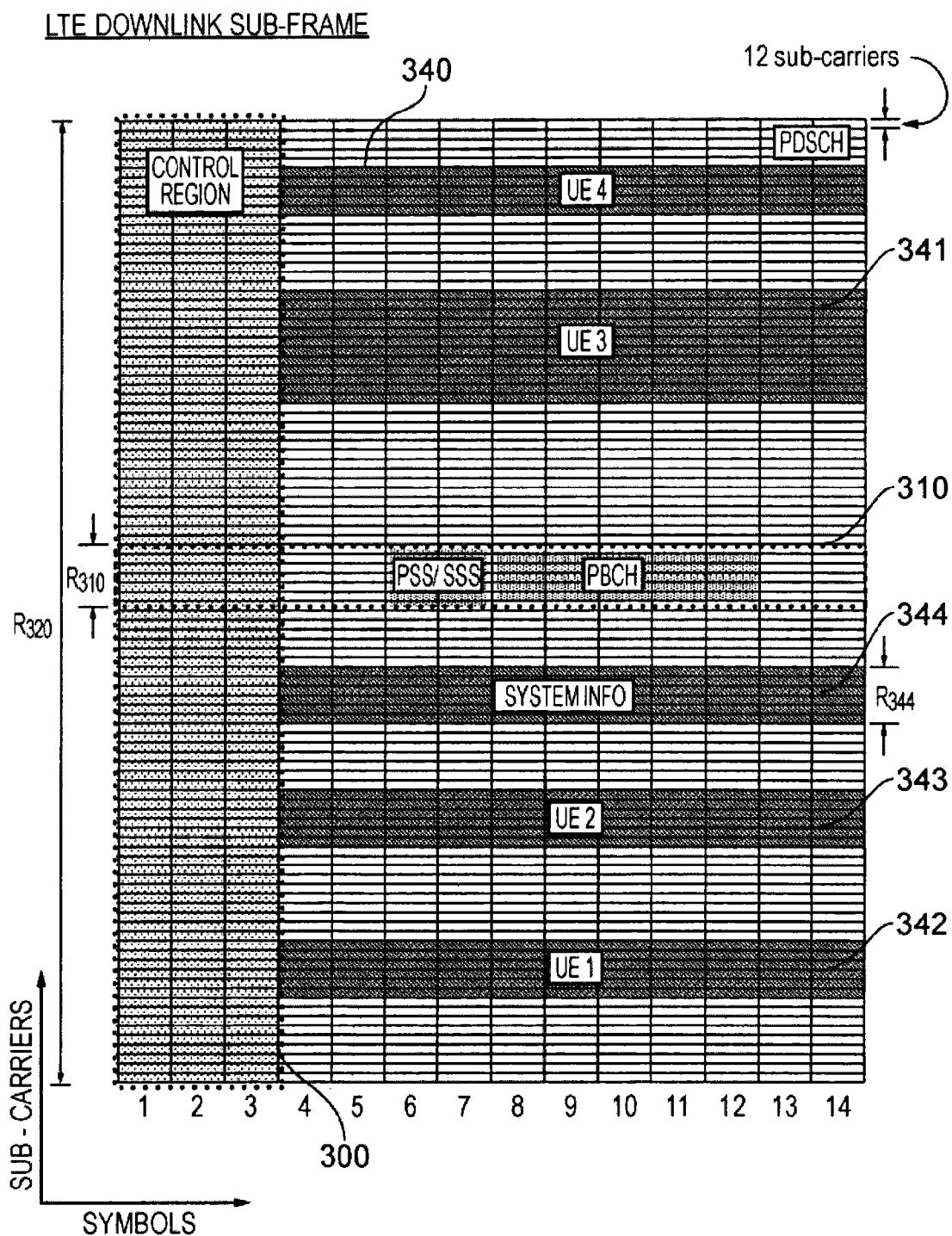
FIG. 3A provides a schematic diagram illustrating an example of a conventional LTE downlink radio sub-frame.

FIG. 3A is a schematic diagram of a grid which illustrates the structure of an example conventional downlink LTE sub-frame. The sub-frame comprises a predetermined number of "symbols", which are each transmitted over a respective 1 ms period. Each symbol comprises a predetermined number of orthogonal sub-carriers distributed across the bandwidth of the downlink radio carrier. Here, the horizontal axis represents time while the vertical represents frequency.

Figure 3B:
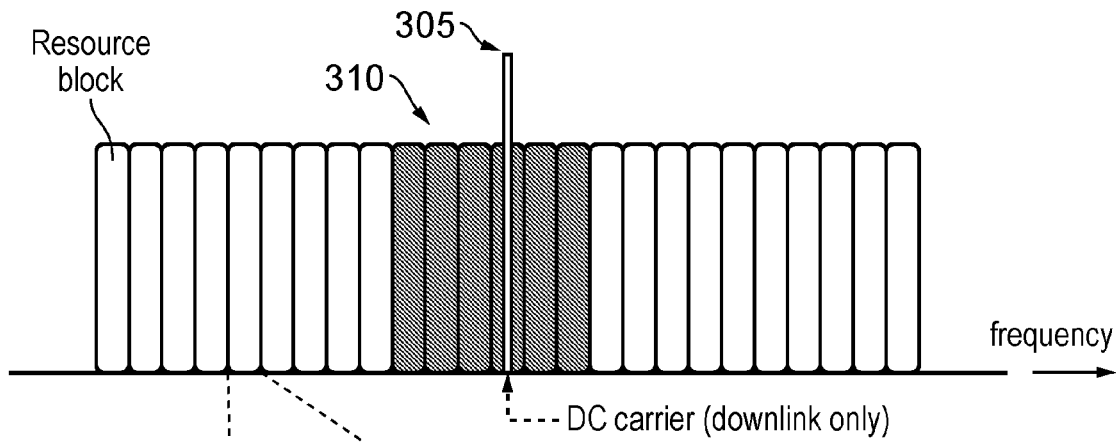
FIG. 3B illustrates the position of the DC subcarrier within a band centred upon a host carrier central frequency in conventional LTE.

As noted above, LTE provides an unused subcarrier 305 at the central frequency of OFDM host carrier. FIG. 3B illustrates the position of the unused subcarrier 305 within a band 310 centred upon a host carrier central frequency.

The example sub-frame shown in FIG. 3A comprises 14 symbols and 1200 sub-carriers spread across a 20 MHz bandwidth, $R_{320}$. The smallest allocation of user data for transmission in LTE is a "resource block" comprising twelve sub-carriers transmitted over one slot (0.5 sub-frame).

Figure 3C:
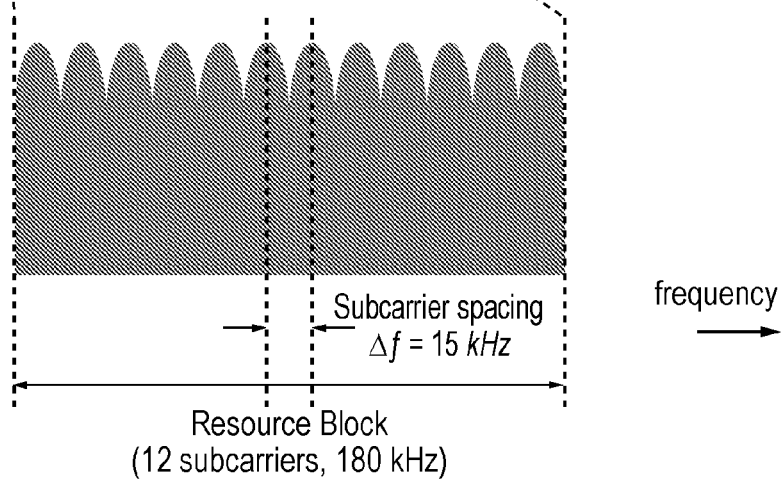
FIG. 3C shows the finer structure within resource blocks of conventional LTE.

FIG. 3C shows the finer structure within each resource block, RB: a resource block represents a 180 kHz band while each subcarrier is spaced 15 kHz apart from its neighbours. Each individual box in the sub-frame grid in FIG. 3A corresponds to twelve sub-carriers transmitted on one symbol.

FIG. 3A shows in hatching resource allocations for four LTE terminals 340, 341, 342, 343. For example, the resource allocation 342 for a first LTE terminal (UE 1) extends over six blocks of twelve sub-carriers (i.e. 60 sub-carriers), the resource allocation 343 for a second LTE terminal (UE2) extends over six blocks of twelve sub-carriers, the resource allocation 341 for a third LTE terminal (UE3) extends over twelve blocks of twelve subcarriers, and the resource allocation 340 for a fourth LTE terminal (UE4) extends over five blocks of twelve sub-carriers.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3A also shows a region of PDSCH 344 containing system information and extending over a bandwidth of $R_{344}$. A conventional LTE frame will also include reference signals which are discussed further below but not shown in FIG. 3A in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3A). As is known in the art, data transmitted on the PDCCH, PCFICH and PHICH is typically distributed on the sub-carriers across the entire bandwidth of the sub-frame to provide for frequency diversity. Therefore a conventional LTE terminal must be able to receive the entire channel bandwidth in order to receive and decode the control region.

As mentioned above, the anticipated widespread deployment of third and fourth generation networks has led to the parallel development of a class of devices and applications which, rather than taking advantage of the high data rates available, instead take advantage of the robust radio interface and increasing ubiquity of the coverage area. This parallel class of devices and applications includes MTC devices and so-called machine to machine (M2M) applications, wherein semi-autonomous or autonomous wireless communication devices typically communicate small amounts of data on a relatively infrequent basis.

Examples of MTC (and M2M) devices include: so-called smart meters which, for example, are located in a customer's house and periodically transmit information back to a central MTC server data relating to the customers consumption of a utility such as gas, water, electricity and so on; "track and trace" applications such as transportation and logistics tracking, road tolling and monitoring systems; remote maintenance and control systems with MTC-enabled sensors, lighting, diagnostics etc.; environment monitoring; point of sales payment systems and vending machines; security systems, etc.

Further information on characteristics of MTC-type devices and further examples of the applications to which MTC devices may be applied can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation terminal device such as a smartphone, an MTC-type terminal is preferably relatively simple and inexpensive: in addition MTC-devices are often deployed in situations that do not afford easy access for direct maintenance or replacement—reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as QAM16 or QAM64) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, there is a desire to optimise the use of the available bandwidth in a telecommunications system supporting such devices.

In many scenarios, providing low capability terminals such as those with a conventional high-performance LTE receiver unit capable of receiving and processing (control) data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal.

A "virtual carrier" tailored to low capability terminals such as MTC devices is thus provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

The term "virtual carrier" corresponds in essence to a narrowband allocation for MTC-type devices within a host carrier for an OFDM-based radio access technology (such as WiMAX or LTE).

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference. For ease of reference, however, an overview of certain aspects of the concept of virtual carriers is also set out here. In providing this overview, the following abbreviations are frequently adopted:

virtual carrier—VC, host carrier—HC, user equipment—UE, resource block—RB, radio frequency—RF, and baseband—BB.

Like conventional OFDM, the virtual carrier concept has a plurality of subcarriers disposed at predetermined offsets from a central frequency: the central frequency thus characterises the entire virtual carrier.

Typical virtual carrier bandwidth is six resource blocks, (i.e. 72 sub-carriers) which is in line with minimum 3GPP bandwidth in LTE. However, as will be seen in the following description, the bandwidth of VC is by no means restricted to 6RBs.

In line with Release 8 of the 3GPP standard for LTE (REL8 LTE), VC resources are typically located in the resource blocks centred on the host carrier centre frequency and symmetrically allocated (at either side of that HC centre frequency) regardless of system bandwidth.

Figure 4:
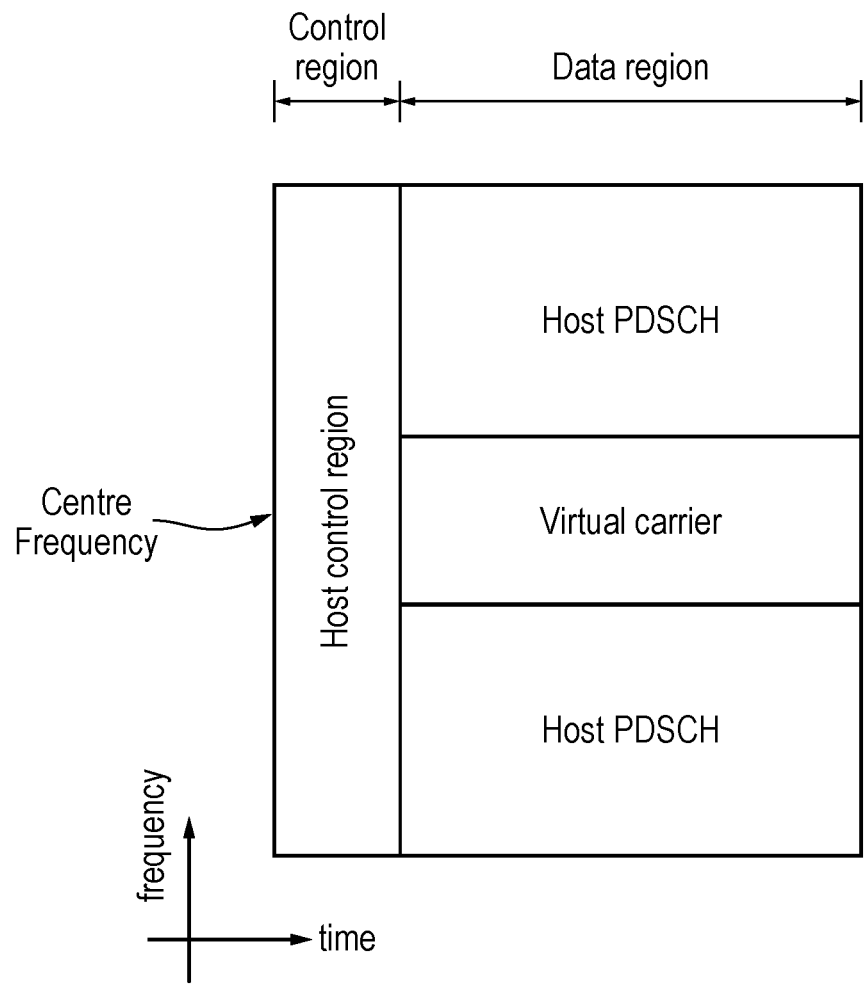
FIG. 4 provides a schematic diagram illustrating an example of a LTE downlink radio sub-frame in which a virtual carrier has been inserted at the centre frequency of the host carrier.

FIG. 4 is a schematic diagram of a grid which illustrates the structure of a downlink LTE sub-frame with a virtual carrier 401 occupying the resource blocks centred on the host carrier centre frequency. The virtual carrier central frequency 403 is selected to be the central frequency 401 of the host carrier.

In keeping with a conventional LTE downlink sub-frame illustrated in FIG. 3A, the first n symbols form the control region 300 which is reserved for the transmission of downlink control data such as data transmitted on the PDCCH, PCFICH or PHICH.

The signals on the virtual carrier 401 are arranged such that signals transmitted by the host carrier that a terminal device operating on the host carrier would require for correct operation and expect to find in a known pre-determined location (e.g. the PSS, SSS, and PBCH in the central band 310 in FIG. 3A) are maintained. The virtual carrier is configured to interweave rather than clash with such host carrier resources.

As can be seen from FIG. 4, data transmitted on the virtual carrier 401 is transmitted across a limited bandwidth. This might be any suitable bandwidth smaller than that of the host carrier. In the example shown in FIG. 4, the virtual carrier is transmitted across a bandwidth comprising 12 blocks of 12 sub-carriers (i.e. 144 sub-carriers), which is equivalent to a 2.16 MHz transmission bandwidth. Accordingly, a terminal using the virtual carrier 401 need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM-based mobile communication systems such as LTE, downlink data is dynamically assigned to be transmitted on different sub-carriers on a sub-frame by sub-frame basis. Accordingly, in every sub-frame, the network signals which sub-carriers on which symbols contain data relevant to which terminals (i.e. downlink grant signalling).

As can be seen from FIG. 3A, in a conventional downlink LTE sub-frame this information is transmitted on the PDCCH during the first symbol or symbols of the sub-frame. However, as previously explained, the information transmitted in the PDCCH is spread across the entire bandwidth of the sub-frame and therefore cannot be received by a mobile communication terminal with a simplified receiver unit capable only of receiving the reduced bandwidth virtual carrier. Accordingly, certain predefined symbols (e.g. the final m symbols, where m is a positive integer) of the virtual carrier can be reserved as a control region for the virtual carrier for the transmission of control data indicating which resource elements of the virtual carrier 401 have been allocated to user equipment (UEs) using the virtual carrier.

As the virtual carrier 401 is located within the centre band 310 of the downlink sub-frame, the impact on host carrier PDSCH resources caused by the introduction of the virtual carrier within the host carrier bandwidth is reduced since the resources occupied by the PSS, SSS and PBCH would be contained within the virtual carrier region 401 and not the remaining host carrier PDSCH region.

It has been seen as desirable to extend the concept of virtual carriers to blocks of OFDM subcarriers that are not centred on the host carrier central frequency. As previously mentioned, co-pending patent application number GB 1113801.3 [11] describes one arrangement where there is a plurality of MTC devices and the central frequency of at least some of the virtual carriers is not same as the central frequency of the host carrier.

Figure 5:
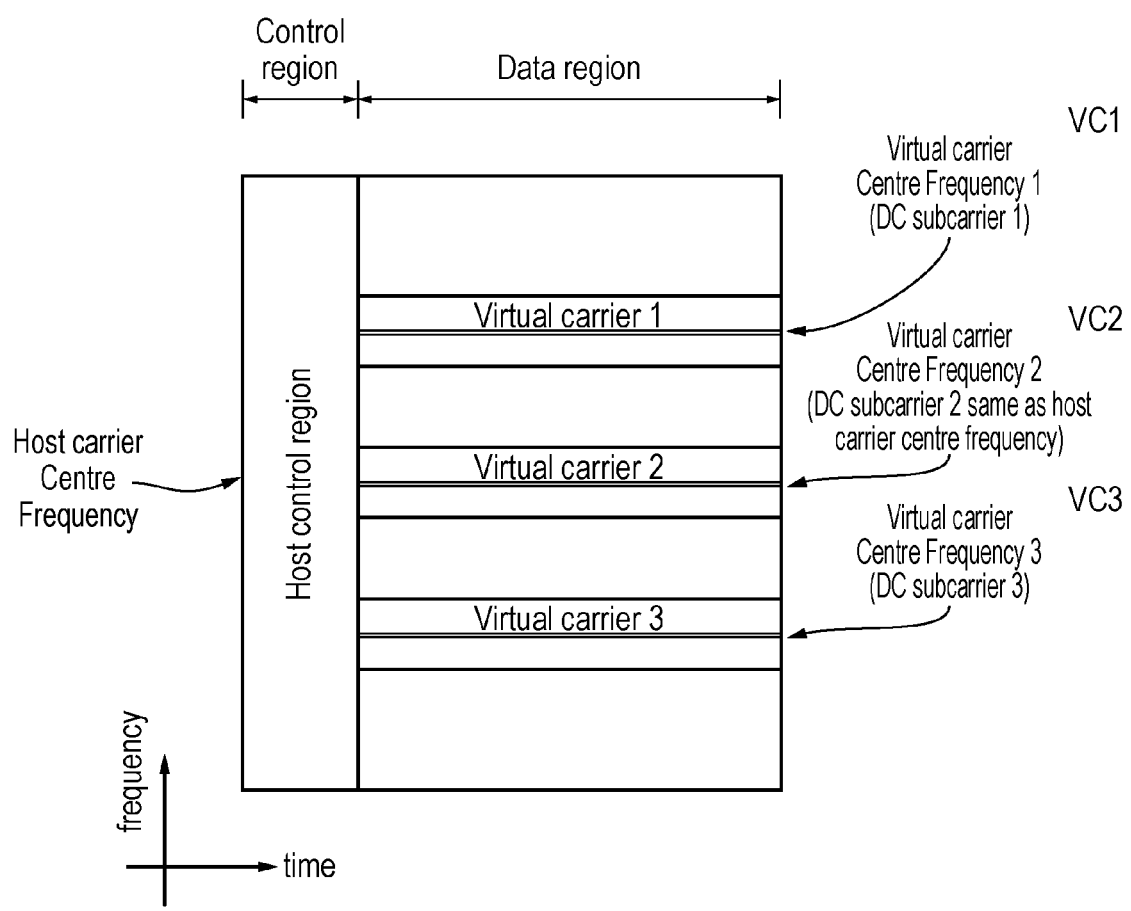
FIG. 5 provides a schematic diagram illustrating an example of a LTE downlink radio sub-frame in which virtual carriers have been inserted at a number of frequencies of the host carrier, requiring allocation of additional unused subcarriers (DC subcarriers) at the centre frequency for each such virtual carrier.

FIG. 5 illustrates this arrangement. A LTE downlink sub-frame is shown with a plurality of virtual carriers outside of the control region 300, the data region includes a group of resource elements positioned below the central band 310 which form a virtual carrier VC3 501. The virtual carrier VC3 501 is adapted so that data transmitted on the virtual carrier VC3 501 can be treated as logically distinct from data transmitted in the remaining parts of the host carrier and can be decoded without decoding all the control data from the control region 300.

FIG. 5 also shows virtual carriers occupying frequency resources above the centre band (VC1, 502) and (as in the situation illustrated in FIG. 4) including the centre band (VC2, 401).

Therefore, depending on, for example, the expected virtual carrier throughput, the location of a virtual carrier can be appropriately chosen to either exist inside or outside the centre band 310 according to whether the host or virtual carrier is chosen to bear the overhead of the PSS, SSS and PBCH. This band allocation method for multiple VCs has particular application when terminals (UEs) using the VC create a significant quantity of traffic at a given time.

However, in respect of this latter case, it has been recognised that the impact of the allocation to non-central virtual carriers upon terminal receivers having direct conversion mechanism needs to be considered.

As noted previously, direct conversion receiver architectures are convenient for manufacturers and are widely used in conventional 3G mobile phones. This receiver architecture converts (carrier modulated) radio frequency (RF) signals to baseband (BB) signals, i.e. the "modulating" signal typically at frequencies close to 0 Hz, directly without intermediate frequency (IF).

Figure 6A:
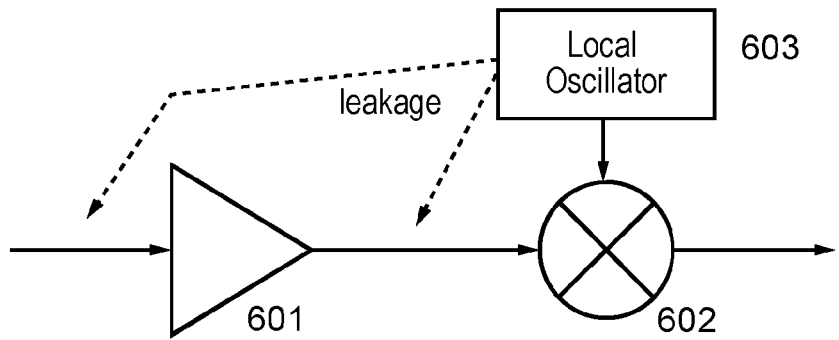
FIG. 6A provides a schematic illustration of a direct conversion (zero-IF) receiver architecture.

FIG. 6A illustrates the general architectural scheme of a Direct Conversion receiver unit. An RF signal is received by an amplifier 601 from an antenna arrangement (not shown). The amplifier 601 applies a gain to the received RF signal. A local oscillator 603, set at the RF carrier frequency, generates an oscillator signal that is mixed with the received RF signal in a mixer 602, thereby down-converting the received RF signal to a base band signal.

Direct Conversion makes possible an architecture that is simple and that requires a reduced number of RF parts (when compared with alternatives such as the heterodyne receiver arrangement with IF filter described below). In terms of cost saving and size reduction, the direct conversion architecture is preferable for MTC type devices.

Figure 6B:
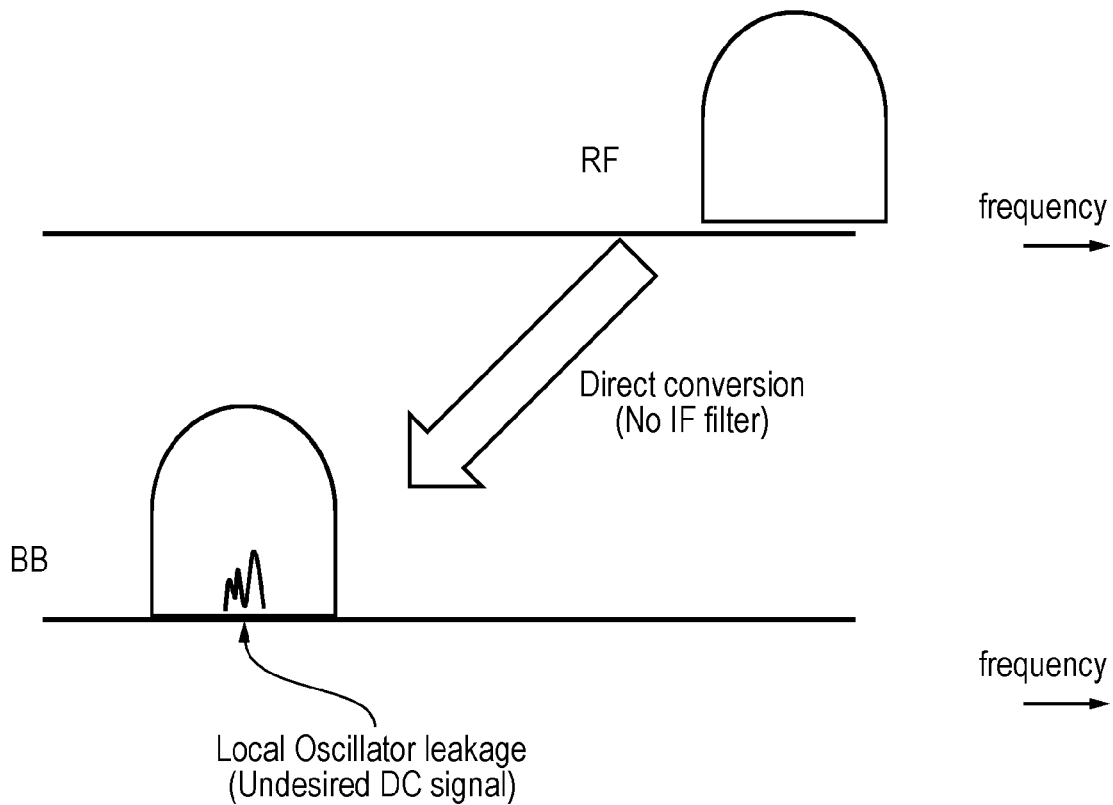
FIG. 6B provides a schematic illustration of DC offset arising in a direct conversion (zero intermediate frequency—zero IF) architecture.

FIG. 6B illustrates this down-conversion from RF to BB frequencies and identifies a known vulnerability of Direct Conversion—self-mixing. If a receiver is imperfect (more likely in the case of low-cost, small form-factor devices), local-oscillator (LO) leakage may occur. The signal generated by the local oscillator 603 may interfere with the signal received at the amplifier 601 and/or the received RF signal provided to the mixer 602. This causes a phenomenon known as "DC offset", where DC stands for Direct Current. A helpful description of the causes of DC offset may be found at reference [10].

Figure 7:
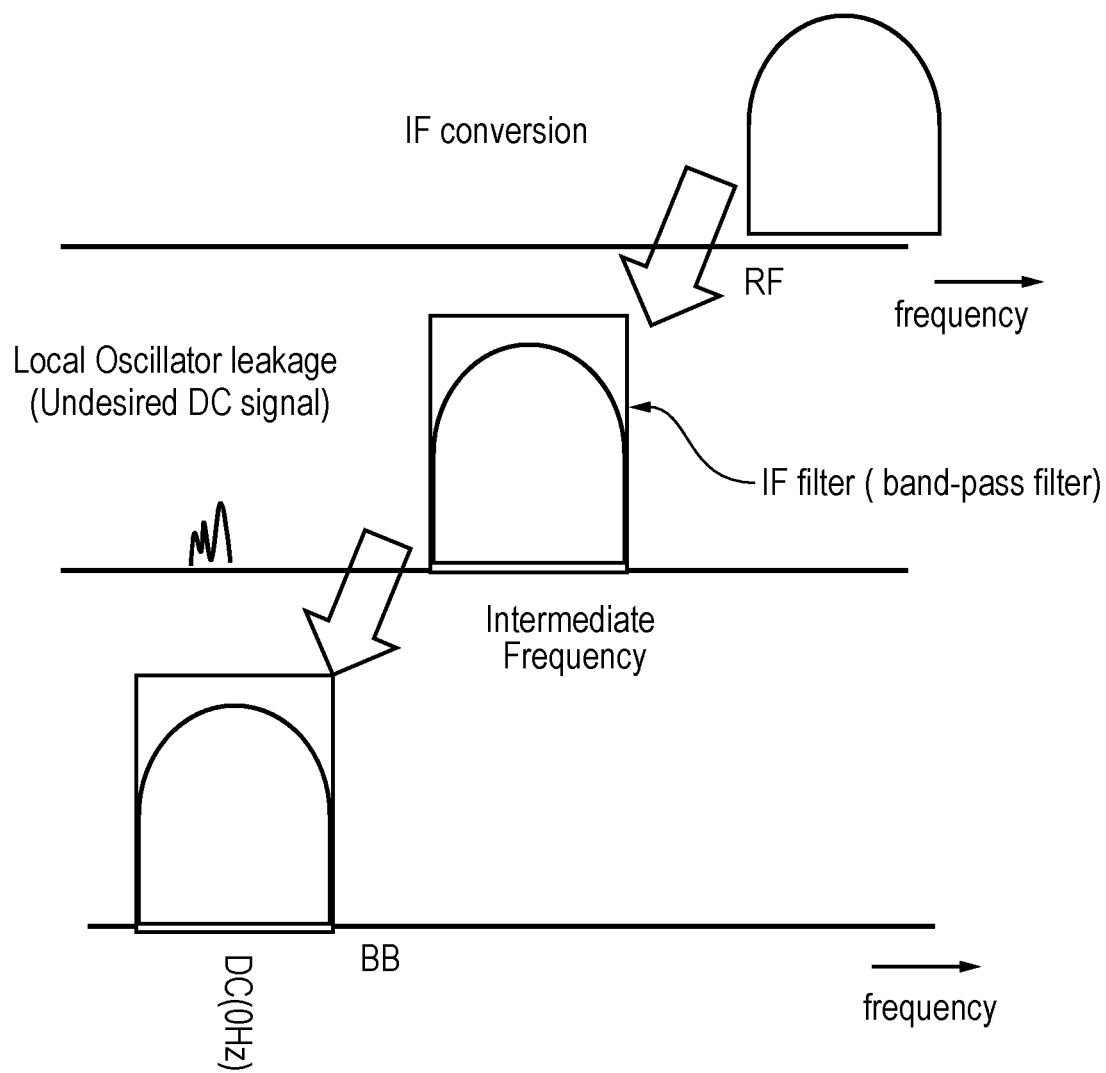
FIG. 7 provides a schematic illustration of an "indirect" conversion (e.g. heterodyne) architecture using an intermediate frequency filter to bypass DC offset.

Alternatives to direct conversion do exist—as the name implies an "indirect" conversion mechanism may be applied. One such alternative is the heterodyne architecture illustrated in FIG. 7: here radio frequency is converted to an intermediate frequency (IF) before then being converted to baseband, the IF being selected to facilitate filtering out of any DC offset components.

There is no IF filter to remove DC offset in a direct conversion architecture (indeed the alternative name for the architecture is "zero-IF").

The DC offset disrupts the demodulation of symbols at the centre frequency of the host carrier, i.e. those frequencies which when converted to BB are close to 0 Hz. While conventional error correction techniques could be applied to address this disruption (see the remarks below concerning "puncturing"), if direct conversion is to be adopted in significant numbers of terminal devices, the best way to avoid the disturbance by DC offset is avoid using the centre frequency for data allocation.

It is for this reason that (as may be seen from the relevant equation in 3GPP 36.211 V8.4.0 section 6.12) LTE defines a baseband signal that has no component at its centre frequency): in other words, LTE has a subcarrier to which no data may be allocated at its host carrier centre frequency. More generally, OFDM based radio access systems typically feature a subcarrier upon which no information is sent. This unused subcarrier is conventionally referred to as a "DC subcarrier", the DC again standing for "direct current".

Before a conventional LTE terminal can begin transmitting and receiving data in a cell, it first camps on to the cell. Similarly, an adapted camp-on process can be provided for terminals using the virtual carrier. A suitable camp-on process for virtual carriers is described in detail in GB 1113801.3 [11]: this camp-on process is incorporated herein by reference.

As described in GB 1113801.3 [11], both "conventional LTE" and virtual carrier implementations could conveniently include location information for the virtual carrier within the PBCH, which already carries the Master Information Block (MIB) in the host carrier centre band. Alternatively, virtual carrier location information could be provided in the centre band, but outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

While the virtual carrier location information, if provided, can be provided elsewhere in the host carrier, it may be advantageous to provide it in the centre band, for example because a virtual carrier terminal may configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). This process too is discussed in detail in GB 1113801.3 [11].

In low traffic conditions, the allocation of a new unused sub-carrier for each new virtual carrier (illustrated in FIG. 5) is adequate. Conveniently, an additional DC subcarrier (unused sub-carrier) is allocated by a base station at the centre frequency of each virtual carrier as that virtual carrier is established.

In the "simple" FIG. 5 example, virtual carrier VC2 has the same centre frequency as the host carrier. The respective centre frequencies for virtual carriers VC1 and VC3 are different from the centre frequency of host carrier (and VC2).

The base station allocating sub-carriers includes a radio resource management (RRM) unit and a scheduler. The RRM decides the centre frequency of VC for a MTC UE while the scheduler allocates the DC subcarrier (unused subcarrier) at that VC centre frequency.

Figure 8A:
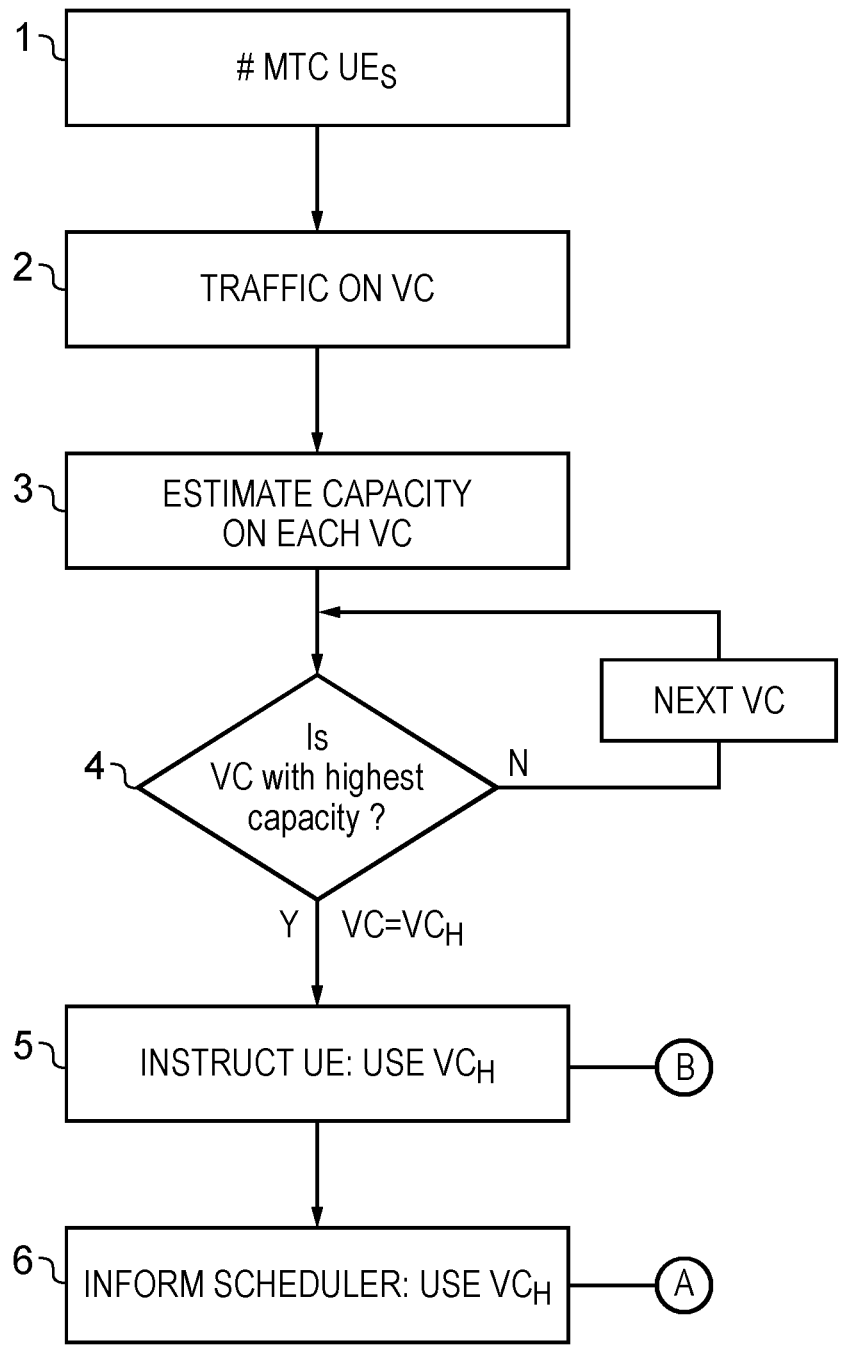
FIG. 8A provides a schematic illustration of the operation of a base station RRM in determining to which virtual channel to allocate a UE.

FIG. 8A illustrates the logical steps taken by the RRM for deciding centre frequency:
 1. Check the number of existing MTC UEs camped on the base station
 2. Check the traffic (active state) of each VC
 3. Estimate the available capacity in each VC
 4. Select the best VC (e.g. the VC having the highest available capacity)
 5. Indicate a decided VC position to UE by RRC protocol.
 [The indication by higher layer (camp on process) is discussed in greater depth above]
 6. Indicate a decided VC position to scheduler inside base station.

Figure 8B:
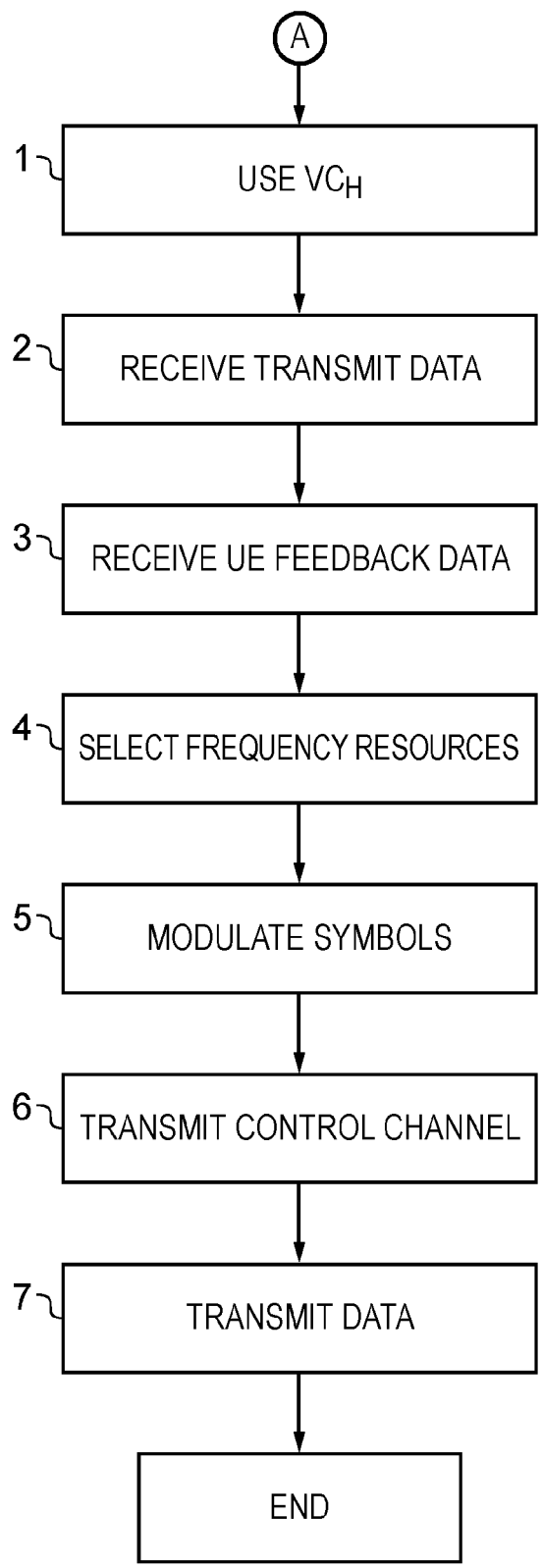
FIG. 8B provides a schematic illustration of the operation of a base station scheduling unit in transmitting data to a UE to which a given virtual channel has been assigned.

FIG. 8B illustrates the logical steps taken by the scheduler as it allocates an unused (DC) subcarrier allocation:
 1. Receive the VC position from RRM
 2. Obtain the transmit data from queue.
 3. Obtain the feedback information from UE.
   a. channel quality information (CQI)
   b. scheduling request (SR)
 4. Decide the frequency resources required to transmit data (i.e. subcarriers) except centre frequency
 5. Modulate each symbol
 6. Transmit control channel (VC-PDCCH)
 7. Transmit data channel (VC-PDSCH)

Figure 8C:
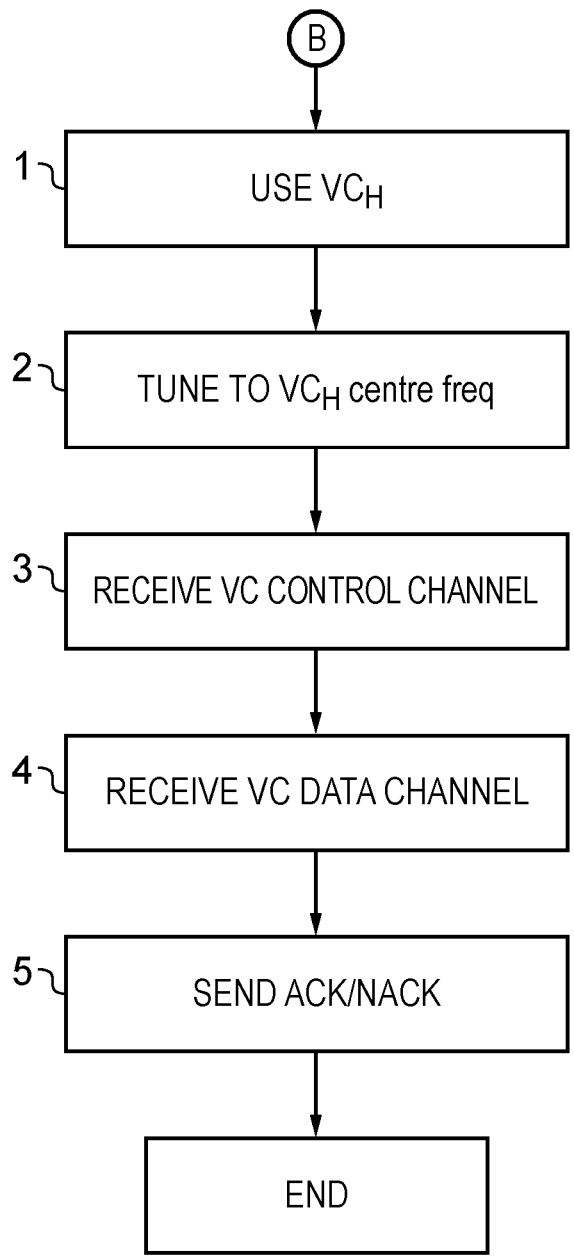
FIG. 8C provides a schematic illustration of the operation of the UE of FIGS. 8A and 8B.

FIG. 8C illustrates the operation of a terminal in the VC allocation scheme of FIG. 5:
 1. Receive the VC position by higher layer (e.g. RRC message)
 2. Change the VC centre frequency.
 3. Wait for the VC-PDCCH.
 4. Receive the VC-PDSCH
 5. Send acknowledgements when successful (ACK)/unsuccessful (NACK)

A new MTC UE architecture for narrow band (i.e. virtual carrier operation) has been proposed in the relevant 3GPP standard. The proposed new architecture seeks to permit an RF bandwidth capability that is different from the baseband one. In one particular proposal, the RF bandwidth in MTC terminal is same as host carrier bandwidth (e.g. 20 MHz), while the baseband processing is narrow band (e.g. 1.4 MHz): i.e. significantly narrower than the host carrier bandwidth.

Figure 9:
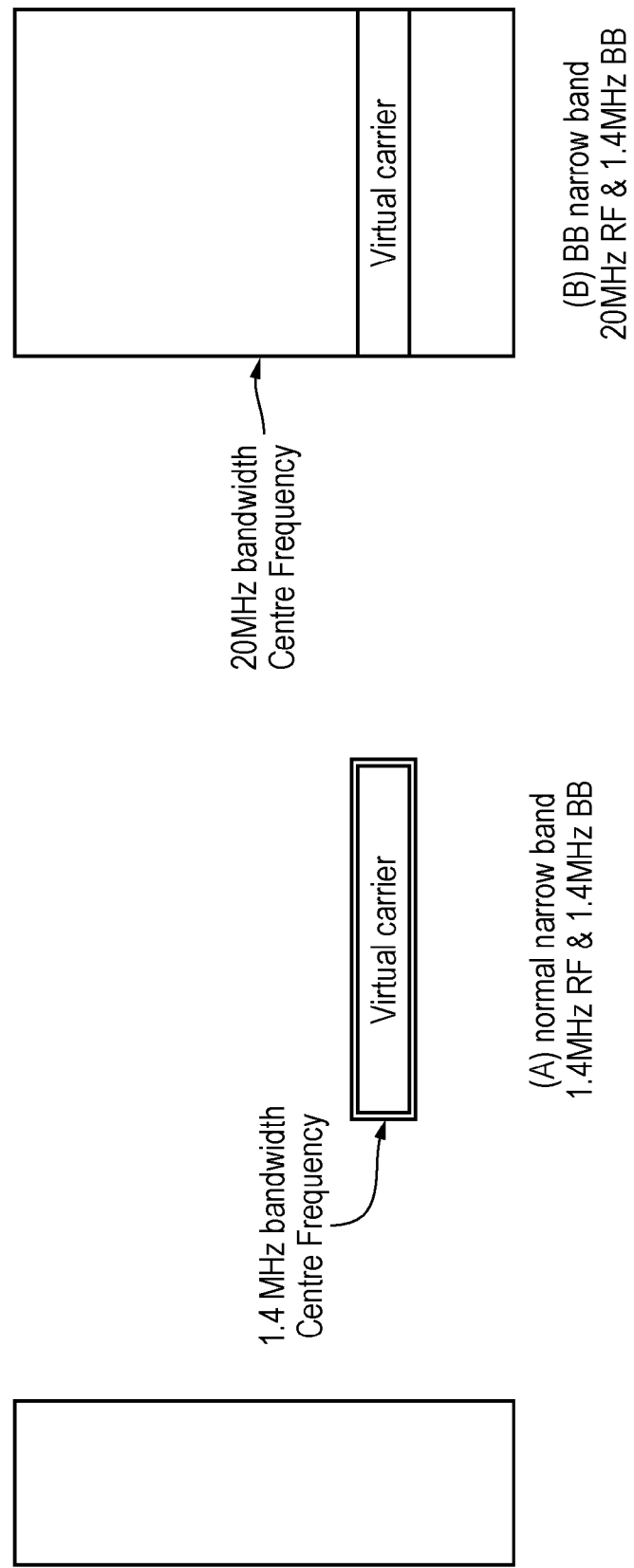
FIG. 9 provides a schematic diagram illustrating two terminal radio frequency architectures: "normal narrow band" (A) and "baseband narrow band" (B)

For the sake of convenience, the combination of narrow band for both RF and baseband is referred to hereafter as "Normal narrow band" or "type A" architecture: a combination of narrow band for only Baseband and "full"—i.e. same as HC—bandwidth for RF is termed "Baseband narrow band" or just "type B" architecture. The operational frequency bands for these two types of RF receiver architecture are illustrated in FIG. 9. The type A architecture (910) requires that control signals and data are all transmitted for a virtual channel on the relevant narrow band. The type B architecture (920) requires instead that the receiver operates on the full bandwidth for RF.

Figure 10:
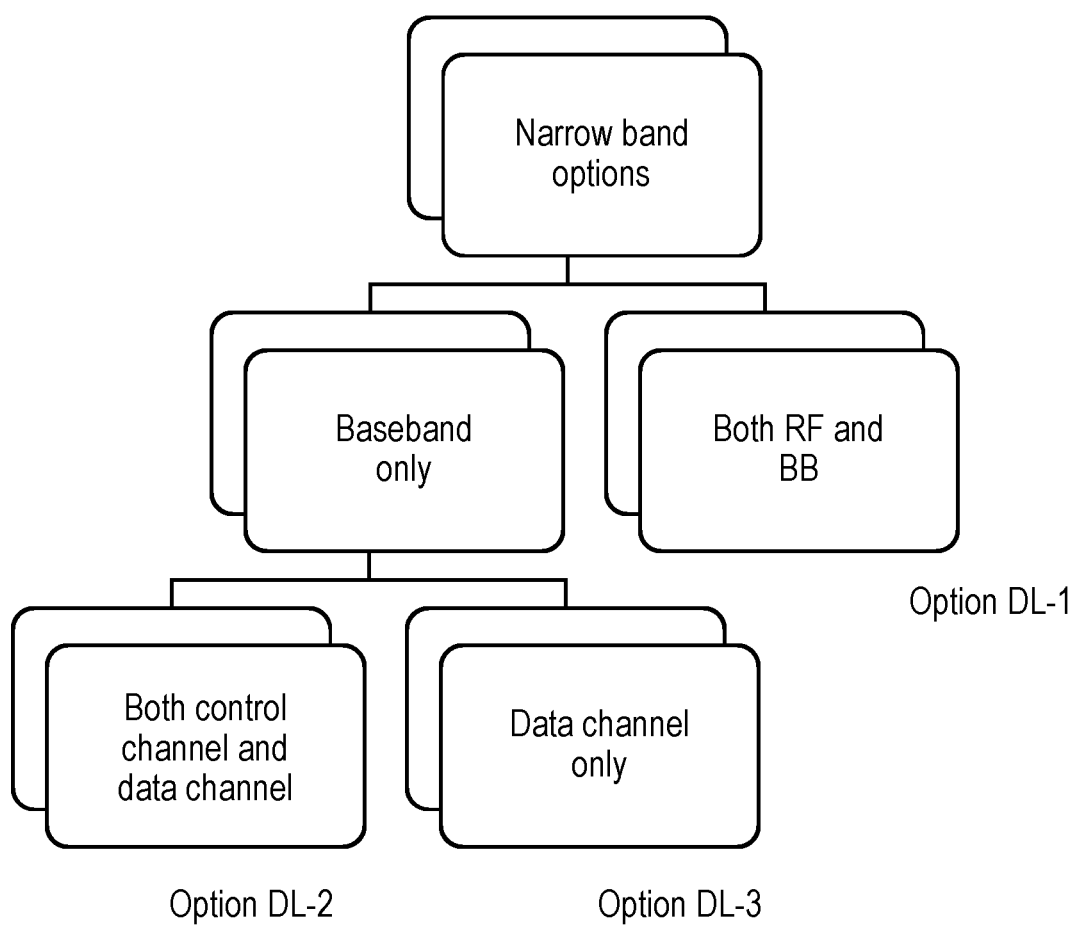
FIG. 10 provides a schematic diagram of a selection of options in terminal radio frequency architectures for uplink and downlink the baseband narrow band architecture is further subdivided.

Variants of the type B architecture are contemplated—see FIG. 10. As may be seen from the illustrations of the LTE downlink sub-frame—FIGS. 3A, 4 and 5—the user plane data is transmitted in different symbols (i.e. at different times) from the control data whereby radio communication is established and maintained. Type A architectures are referred to as Option DL-1.

In a first variant of the type B architecture, Option DL-2, control and data channels are received in the baseband in narrowband.

In another variant of the type B architecture, Option DL-3, control channels are received in the baseband at full bandwidth while narrowband operation is reserved for the data channel One benefit of the type B (Baseband narrow band) architectures is that there is no need for a DC subcarrier for VCs located away from the HC centre frequency because the VC centre frequency is same as LTE HC centre frequency in terms of direct conversion.

In this regard it is worth noting that direct conversion is a function of RF transceiver large scale integrated (LSI) circuitry (see the inset portion of FIG. 6), not of the baseband unit.

Problems may arise when both Normal narrow band (type A) terminals and Baseband narrow band (type B) terminals operate under the same host carrier (the mixed operation case). In other words, it would be desirable to maximize the benefit of "baseband narrow band" (type B) in the mixed operation case.

Figure 11:
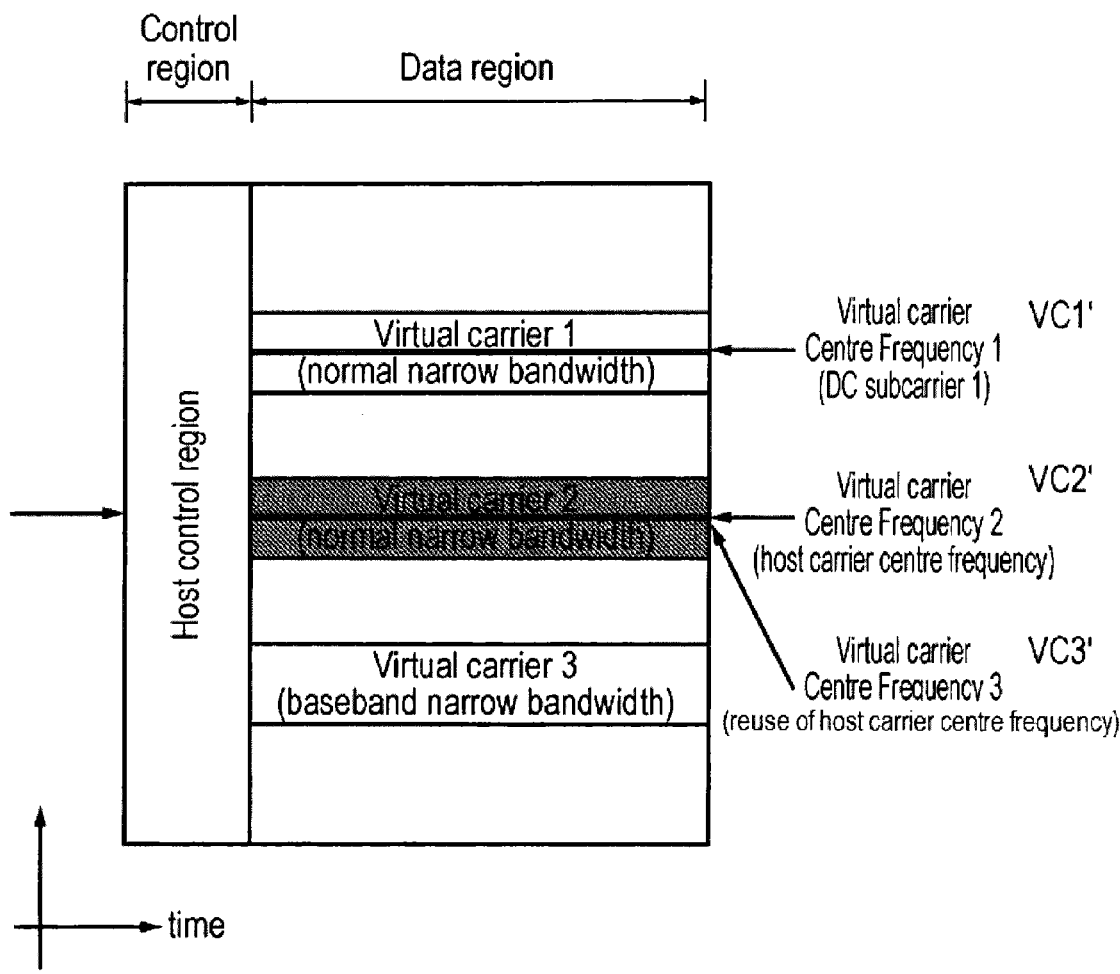
FIG. 11 provides a schematic diagram illustrating an LTE downlink radio sub-frame in which a virtual carrier has been inserted in accordance with an embodiment of the invention.

FIG. 11 illustrates the case where terminals of both types (A and B) make use of the same host carrier.

In VC1', MTC UE is assumed to be type A, VC1' has its own DC subcarrier (DCsubcarrier 1): this corresponds to the "simple" case described above (in FIG. 5) where an additional unused sub-carrier is allocated at the centre frequency of each virtual carrier.

In VC2', MTC UE is also assumed to be type A, VC2' can reuse host carrier centre frequency. As a large number of terminals are likely to use LTE host carrier centre frequency, this arrangement may not be the most robust or effective, from a resource usage point of view.

In VC3', MTC UE is assumed to be type B. VC3' reuses the host carrier centre frequency and is not provided with its own unused subcarrier: only a type B architecture can use such a VC without exposing the UE to self-mixing. From a resource allocation point of view, this is efficient. This means "baseband narrow band" (type B) device has an advantage in terms of flexibility of band allocation for virtual carrier.

The base station in the mixed operation case described above is required to do more that for the previous "simple" case. In particular it must discover the terminal RF capability before deciding how to allocate virtual carrier capacity.

The base station must firstly determine the RF capability (e.g. RF bandwidth) for each terminal. If that RF capability indicates a terminal of Baseband narrow band (type B), the base station allocates the VCs for this terminal to non-centre frequency of host carrier where capacity permits. If however, the detected RF capability indicates a terminal of Normal narrow band (type A), the base station will allocate the VCs for this terminal to LTE centre frequency of host carrier as long as capacity allows; otherwise the base station allocates remaining VCs (for type A terminals) to LTE non-centre frequency of host carrier but requires that these VCs provide an unused subcarrier at their centre frequency.

The terminal is thus required to: report its "bandwidth status" (e.g. RF capability and/or RF bandwidth) to base station and to follow VC allocation instructions transmitted by the base station.

As previously, the base station includes a radio resource management (RRM) unit and a scheduler. Again, the RRM decides the centre frequency of VC for a MTC UE while the scheduler allocates the DC subcarrier (unused subcarrier) at that VC centre frequency.

Figure 12A:
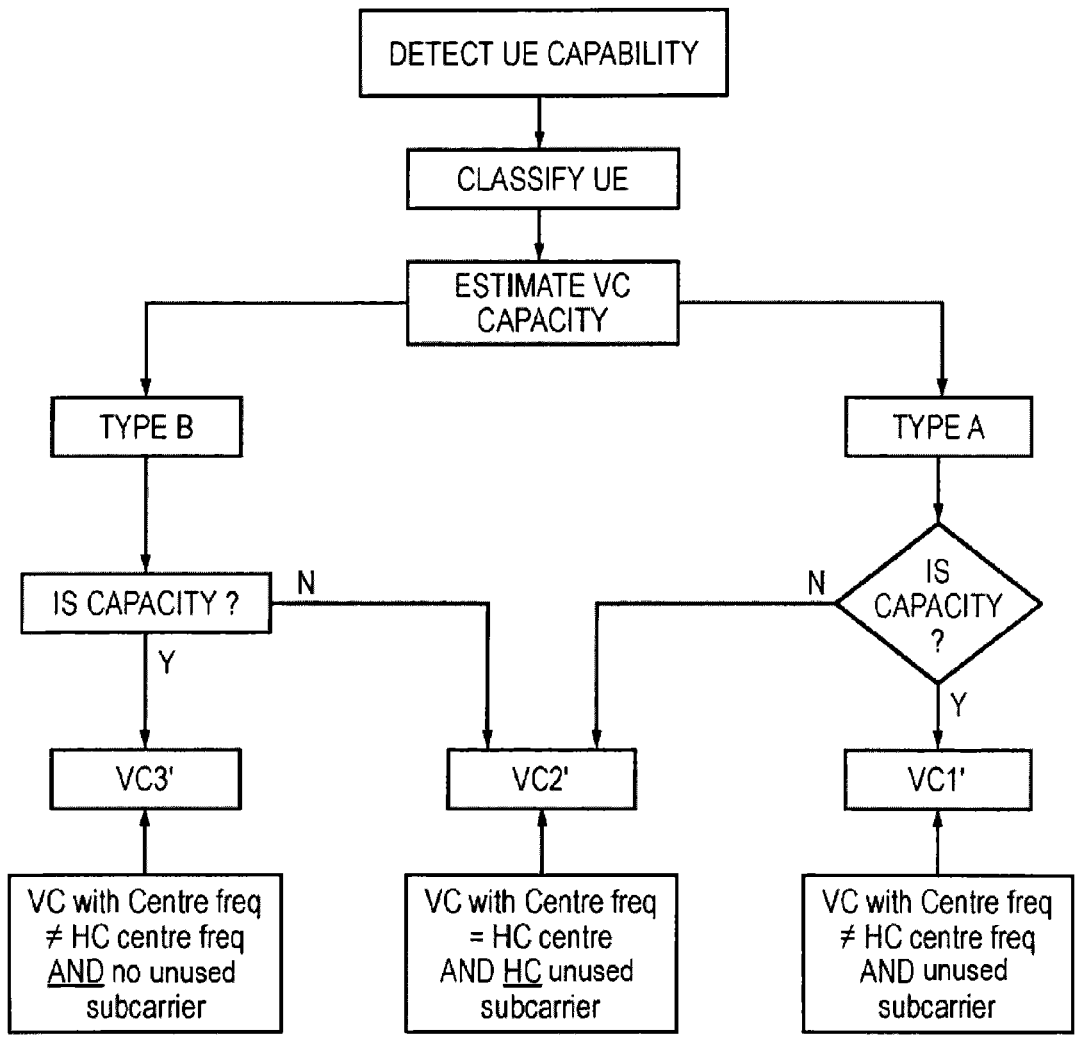
FIG. 12A provides a schematic illustration of the operation of a base station RRM in determining to which virtual channel to allocate a UE, where allocation of virtual carriers depends upon terminal RF capability, in accordance with an embodiment of the invention.

FIG. 12A illustrates the logical steps taken by the RRM for deciding centre frequency:

1. Determine the UE bandwidth status (RF capability) in advance (e.g. during RRC connection setup)
2. Check the number of existing MTC UEs camped on the base station.
3. Check the traffic (active state) of each VC (e.g. how congested)
4. Estimate the available capacity in each VC
5. Select the best VC (e.g. the VC having the highest available capacity and best adapted to serve a UE of the determined bandwidth status)
   a. If terminal is Baseband narrow band (type B), a frequency other than original LTE host carrier centre frequency is allocated for VC.
   b. If terminal is normal narrow band (type A), original LTE host carrier centre frequency is allocated for VC.
   c. If terminal is normal narrow band (type A) and there is insufficient capacity at the host carrier centre frequency, a frequency other than original LTE host carrier centre frequency is allocated for VC.
6. Indicate a decided VC position to UE by RRC protocol. [The indication by higher layer (camp on process) is discussed in greater depth above]
7. Indicate a decided VC position to scheduler inside base station.

The logical steps taken by the scheduler as it allocates an unused (DC) subcarrier allocation are identical to those take in the "simple" case and described above in relation to FIG. 8B:

1. Receive the VC position from RRM
2. Obtain the transmit data from queue.
3. Obtain the feedback information from UE.
   a. channel quality information (CQI)
   b. scheduling request (SR)
4. Decide the frequency resources required to transmit data (i.e. subcarriers) except centre frequency
5. Modulate each symbol 6. Transmit control channel (VC-PDCCH)

7. Transmit data channel (VC-PDSCH)

Figure 12B:
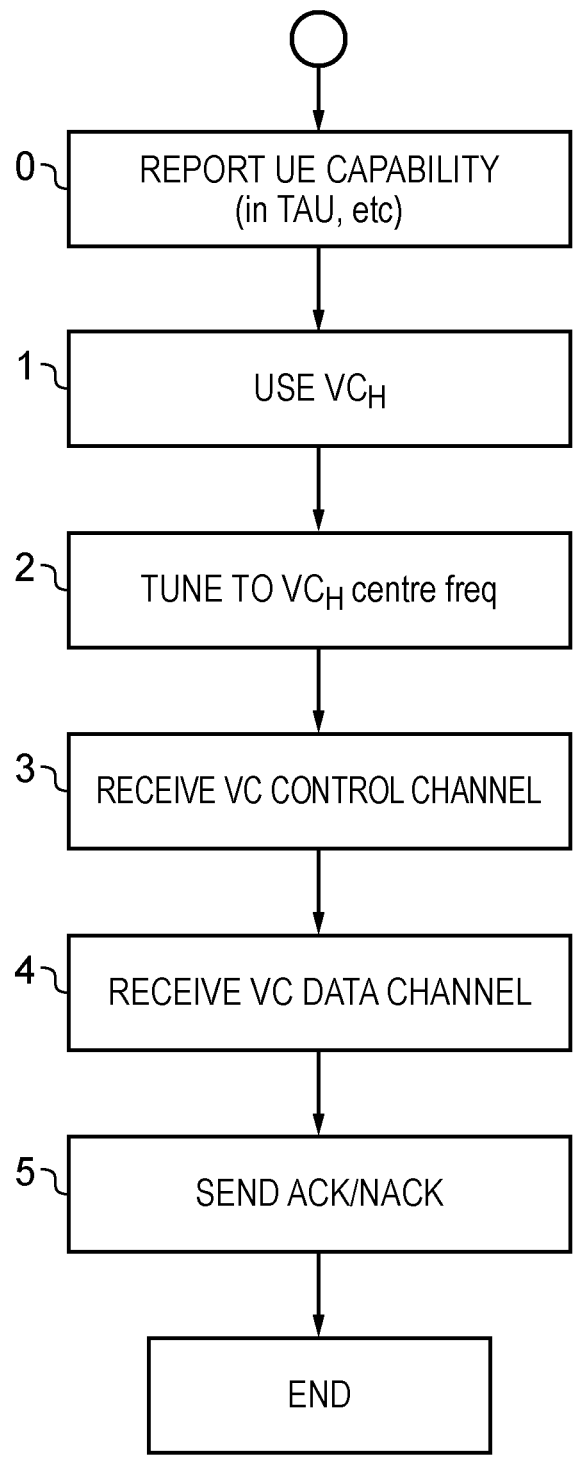
FIG. 12B provides a schematic illustration of the operation of the UE of FIG. 12A in accordance with an example of the present invention.

As noted earlier, the key difference between the first "simple" and second "mixed operation" cases is the requirement in the latter case for each terminal to report its own RF bandwidth capability (bandwidth status) to the base station. FIG. 12B illustrates the operation of a terminal in the VC allocation scheme of FIG. 11: this differs from the scheme illustrated in FIG. 8C in the step for reporting RF bandwidth capability. With that exception, the terminal follows the direction from base station in the same manner as for the "simple" case.

1. Send the RF bandwidth capability information to base station (e.g. RRC connection setup)

2. Receive the VC position by higher layer (e.g. RRC message)

3. Change the VC centre frequency.

4. Wait for the VC-PDCCH.

5. Receive the VC-PDSCH

6. Send acknowledgements when successful (ACK)/unsuccessful (NACK)

Figure 12C:
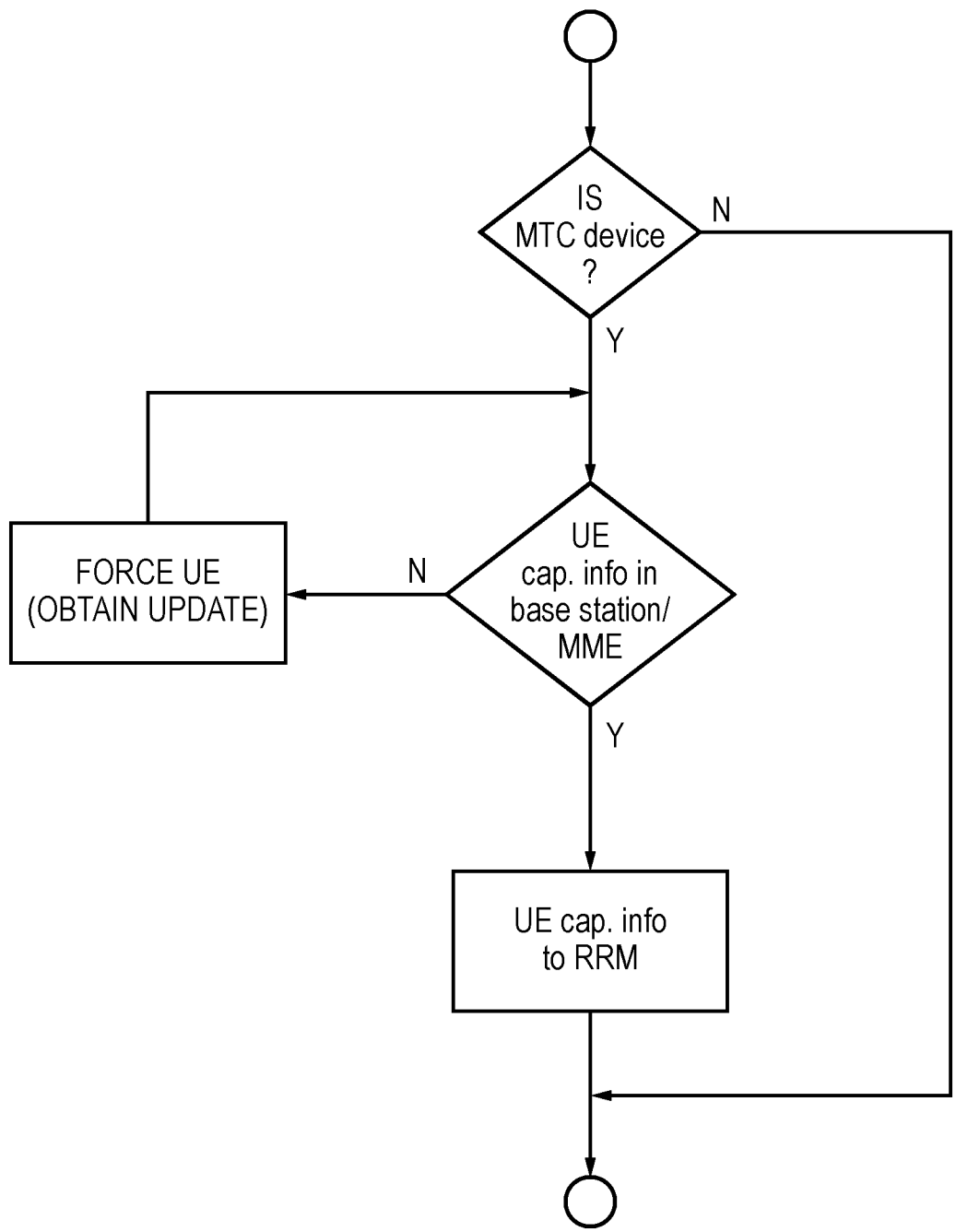
FIG. 12C provides a schematic illustration of the detection of the RF capability of the UE in FIGS. 12A and 12B.

Capability detection in the UE may comprise detection of whether the UE is in fact flagged as an MTC-type device and only if it is will it be necessary to make any determination of RF capability (non MTC-devices not typically needing access to the virtual carrier). FIG. 12C shows one possible arrangement where after determining that the device is of the MTC-type, it is queried whether the base station (or associated core network entities such as the MME) has capability information for the UE: in the absence of such information the base station may interrogate the UE to extract this information—for example by forcing a location update event thereby ensuring that the UE reports its capabilities in accordance with the standard.

Figure 13A:
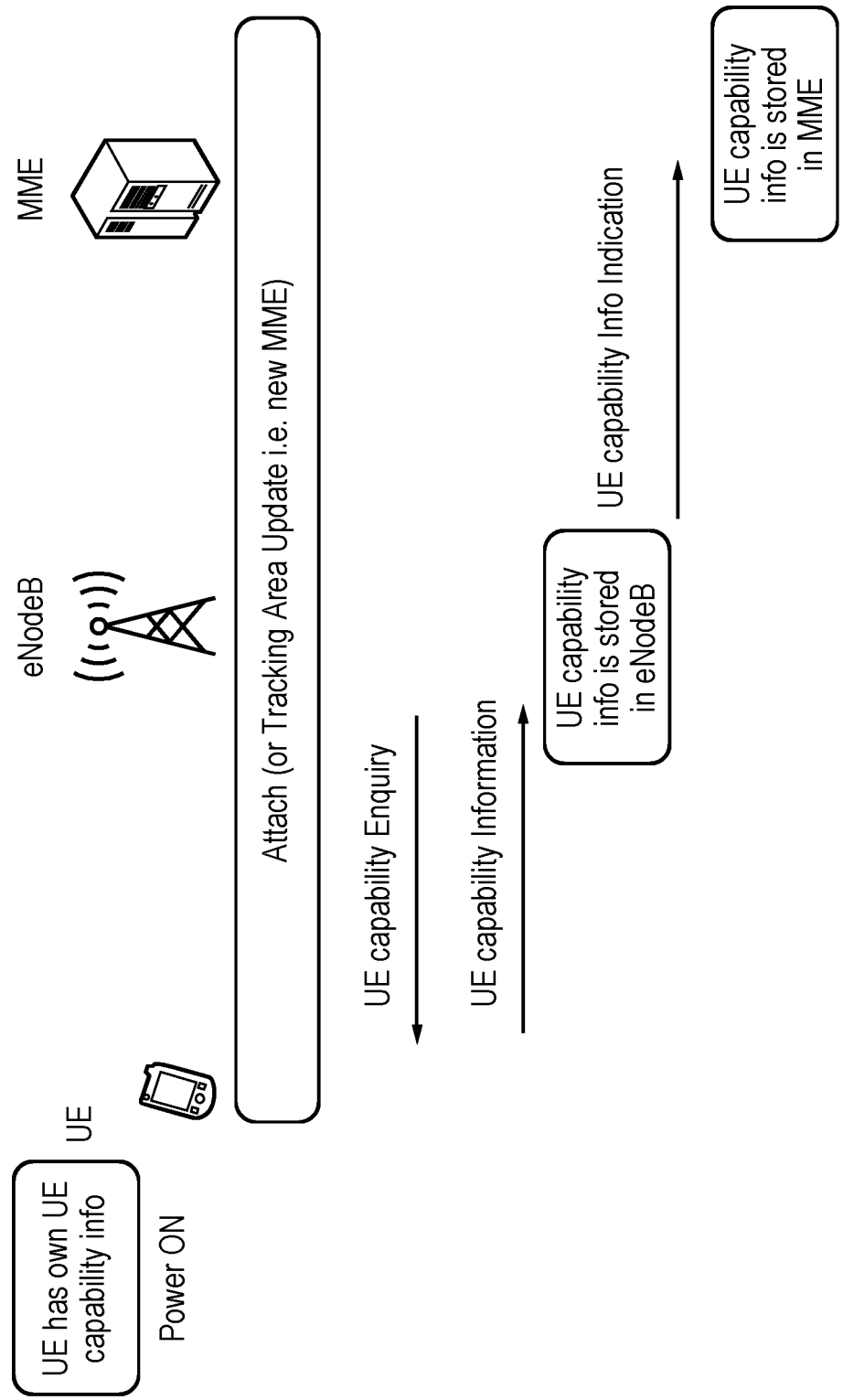
FIG. 13A provides a schematic illustration of the conventional procedure for UE capability transfer in e-UTRAN.

FIG. 13A illustrates the procedure by which terminals (UEs) report capability information to the e-UTRAN network entities in LTE (e.g. REL8 LTE). At power on (or when the UE has recently entered the area of coverage of a base station controlling entity—i.e. the MME), the UE and MME exchange a number of signals to "attach" the UE to the relevant MME and to assign a suitable base station (eNodeB) to the UE. Part of the exchange of signals includes a message from the base station to the UE requesting UE capability information. In response, the UE prepares a message in accordance with a standardised System Information Block (SIB) including an information element (IE) of known format. The IE in turn provides a data structure in which the UE capability may be reported. The details of the 3GPP standard procedure for transmitting UE capability information may be found at 3GPP TS 36.331 V8.12.0 at section 5.6.3. The UECapabilityInformation message described there takes a specific form—each UE capability IE being stored under an UE-Capability RAT-Container. The capability IE of an MTC-type UE may be treated as part of the LTE capability (see TS36.306) or as if it belonged to an independent RAT.

FIG. 13B illustrates a conventional UE-EUTRA-Capability IE into which new IEs relevant to MTC-type devices may be incorporated.

A number of different new IEs may be considered for the purpose of facilitating the reporting of the RF/BB capability of UEs so that certain aspects of the invention may be implemented. While referred to as "bandwidth status", these new IEs may not actually include information directly relevant to bandwidth but rather may serve as indications of the expected bandwidth capabilities of the UE. Examples of new information elements for appending to the conventional UE-EUTRA-Capability IE structure (or to some similar structure that serves to report UE capability) include:

a. "NarrowbandOption"—an IE that takes values corresponding to the different options for downlink bandwidth architecture as illustrated in FIG. 10.

b. "MTC bandwidth"—an IE that includes fields for characterising the bandwidth size for each of the RF, BB and the data-only part of the BB in terms of resource blocks (180 kHz), subcarriers (15 kHz) or in units of MHz c. "Receiver ArchitectureOption"—an IE that takes values corresponding to the type of receiver architecture the UE uses—IF conversion or Direct conversion d. "CentreFrequencyAllocationUEPreference"—an IE within a UE Preference Options structure that takes values corresponding to an indication of whether an allocated centre frequency for that UE is preferred to be "unused" or "used"

Embodiments of the invention may in particular be employed within the context of what might be termed "virtual carriers" operating within a bandwidth of one or more "host carriers". The concepts of virtual carriers are described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], the contents of which are incorporated herein by reference. The reader is referred to these co-pending applications for more details, but for ease of reference an overview of the concept of virtual carriers is also provided here.

Figure 14:
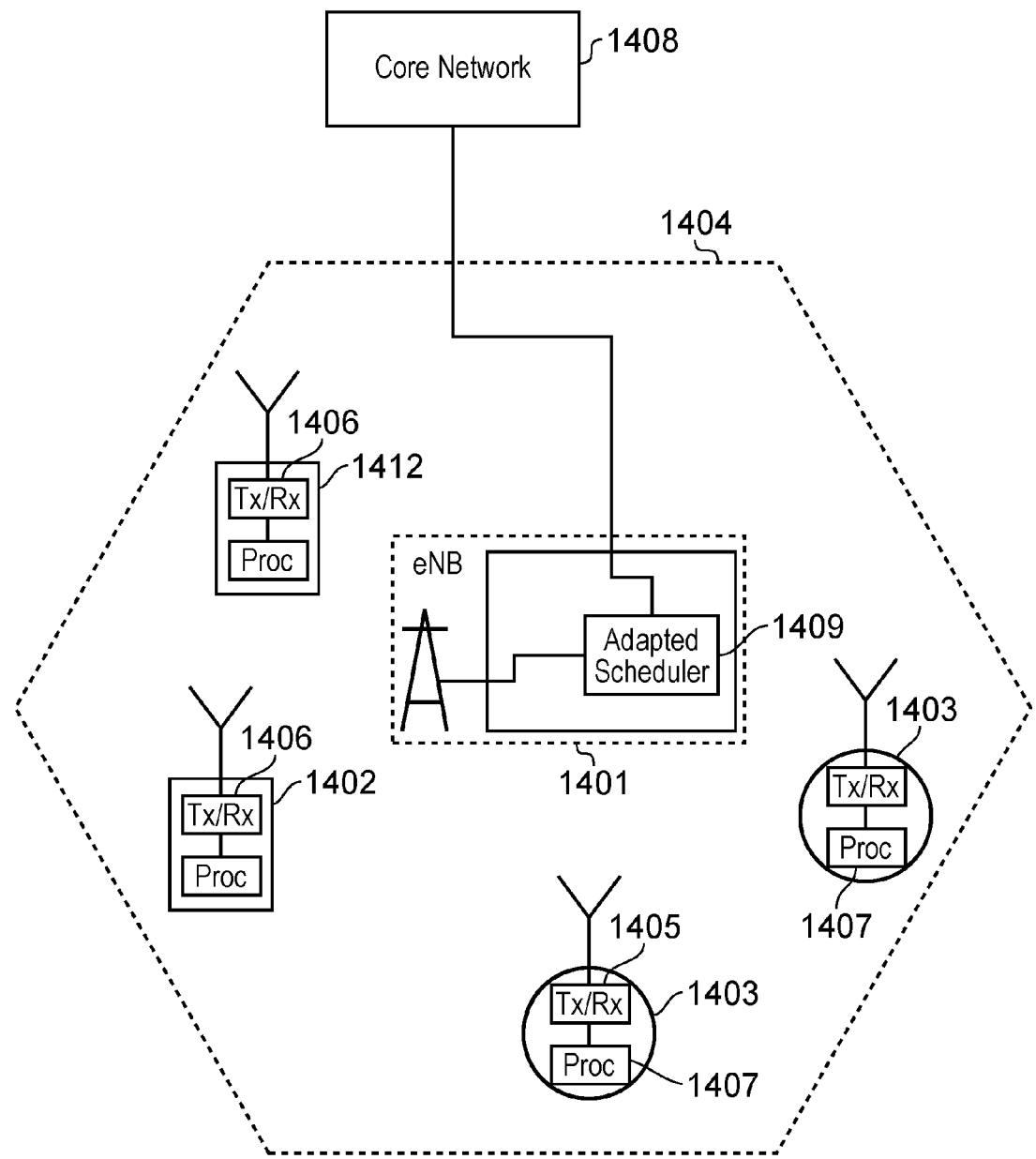
FIG. 14 provides a schematic diagram illustrating a part of an LTE cellular telecommunications network adapted to provide radio access to conventional LTE terminal and reduced capacity terminals in accordance with an embodiment of the present invention.

FIG. 14 provides a schematic diagram showing part of an adapted LTE mobile telecommunication system arranged in accordance with an example of the present invention. The system includes an adapted enhanced Node B (eNB) 1401 connected to a core network 1408 which communicates data to a plurality of conventional LTE terminals 1402 and reduced capability terminals 1403 within a coverage area (cell) 1404. Each of the reduced capability terminals 1403 has a transceiver unit 1405 which includes a receiver unit capable of receiving data across a reduced bandwidth (i.e. narrowband) and a transmitter unit capable of transmitting data across a reduced bandwidth when compared with the capabilities of the transceiver units 1406 included in the conventional LTE terminals 1402.

The adapted eNB 1401 is arranged to transmit downlink data using a sub-frame structure that includes a virtual carrier as described with reference to FIG. 11. The task of assigning reduced capacity terminals 1403 to a given virtual carrier is performed by a radio resource management (RRM) unit 1411 within the eNB 1401. Data is then transmitted to reduced capability terminals 1403 by an adapted scheduling unit 1409 in the eNB. The reduced capability terminals 1403 are thus able to receive and transmit data using the downlink virtual carriers as described above.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

When receiving downlink data from the core network 1408 to be transmitted to one of the terminals within the cell 1404, the adapted eNB 1401 is arranged to queue that data in a queue 1410 and to determine if the data is bound for a conventional LTE terminal 1402 or a reduced capability terminal 1403. This can be achieved using any suitable technique. For example, data bound for a reduced capability terminal 1403 may include a virtual carrier flag indicating that the data must be transmitted on the downlink virtual carrier. If the adapted eNB 1401 detects that downlink data is to be transmitted to a reduced capability terminal 1403, an adapted scheduling unit 1409 included in the adapted eNB 1401 ensures that the downlink data is transmitted to the reduced capability terminal in question on the downlink virtual carrier. In another example the network is arranged so that the virtual carrier is logically independent of the eNB. More particularly the virtual carrier may be arranged to appear to the core network as a distinct cell so that it is not known to the core network that the virtual carrier has any relationship with the host carrier. Packets are simply routed to/from the virtual carrier just as they would be for a conventional cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific terminal device. The eNB is provided with information indicating which logical connection is associated with which terminal device. Information is also provided at the eNB indicating which terminal devices are virtual carrier terminals and which are conventional LTE terminals. This information could be derived from the fact that a virtual carrier terminal would initially have connected using virtual carrier resources.

Virtual carrier terminals are arranged to indicate their capability to the eNB during the connection procedure. Accordingly the eNB can map data from the core network to a specific terminal device based on whether the terminal device is a virtual carrier terminal or an LTE terminal.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. virtual carrier terminals).

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, the term base station refers to any wireless network entity that provides UEs with an air interface to a cellular telecommunications network: while the term has been used interchangeably with e-NodeB in the foregoing it should be understood that it encompasses equivalent network entities in LTE and alternative radio access architectures including: eNode-Bs; Node-Bs, pico-, femto- and micro base station equipment, relays; boosters etc.

Figure 15:
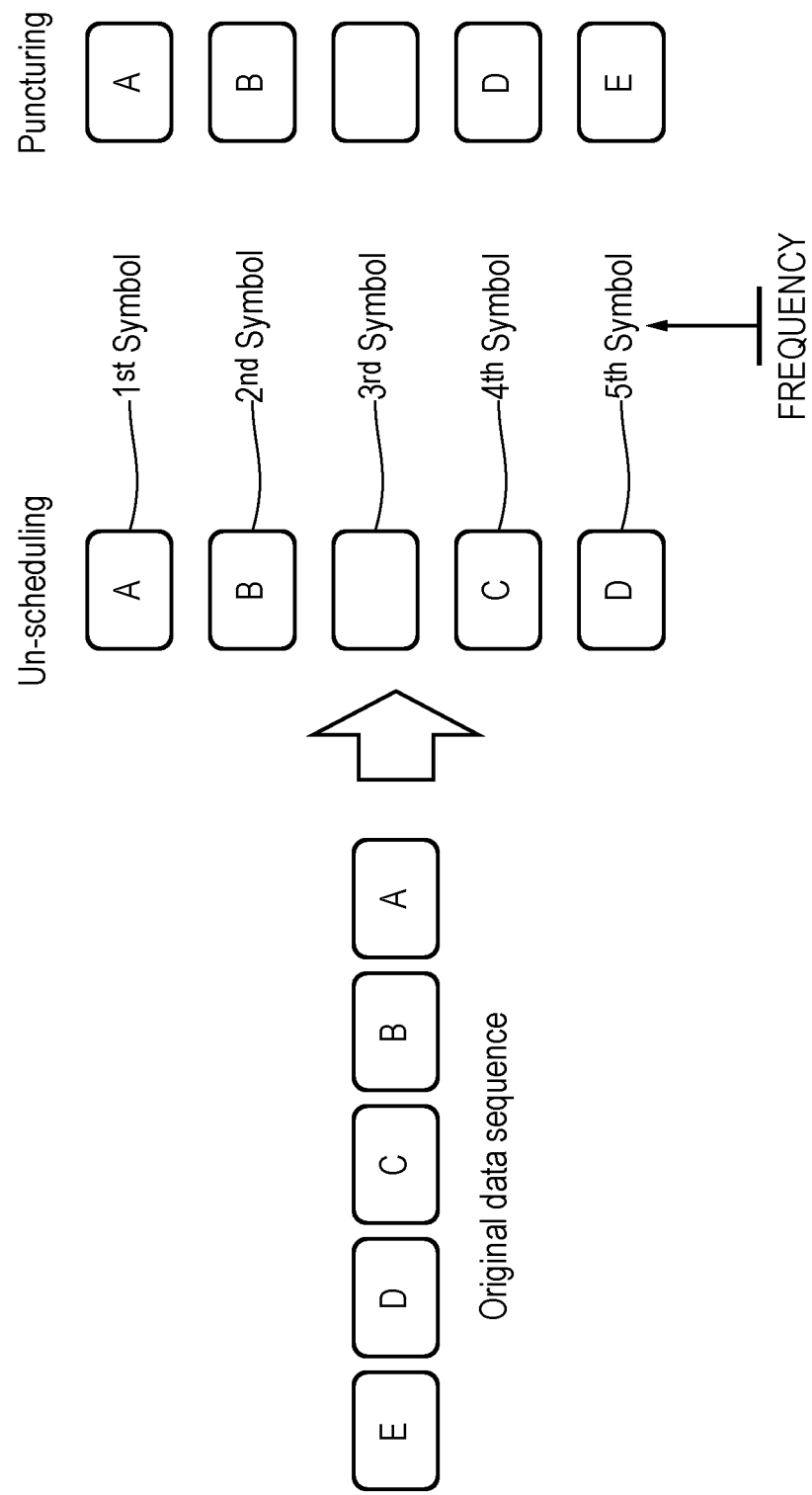
FIG. 15 illustrates the distinction between un-scheduling and puncturing when leaving a subcarrier unused.

The term "unused subcarrier" is used interchangeably with "DC sub carrier" however it encompasses the concept of leaving a subcarrier without data. A subcarrier may be left unused in a number of ways and a different term may be adopted to express the precise manner of "unuse". FIG. 15 illustrates two possible ways of leaving a subcarrier effectively unused. Thus a subcarrier may be ignored by a scheduler entirely scheduling data into other subcarriers but not into an un-scheduled (and thereby "unused") subcarrier: in FIG. 15, data packets A, B, C and D are allocated to the first, second, fourth and fifth symbols—and no data is scheduled for the third symbol.

Alternatively, the scheduler may initially allocate data for the subcarrier in question but the subcarrier is not transmitted: i.e. the allocated data is dropped in an operation known as "puncturing". In FIG. 15, this is illustrated by showing the third of five symbols empty but data packets A, B, D and E allocated to the first, second, fourth and fifth symbols. Data packet C is scheduled but not carried. As the term implies, puncturing entails the receiving terminal receiving incomplete data (the data originally scheduled at the punctured subcarrier is missing). The missing data can however be reconstructed using conventional error correction techniques such as forward error correction (FEC).

It will also be appreciated that although the above description of a scheme in which host carriers and virtual carriers are supported by geographically separated base stations has primarily focussed on downlink transmissions by way of example, the same concepts can equally be applied for uplink transmissions: in particular, where VC centre frequency in uplink is same as HC centre frequency in uplink.

Further particular and preferred aspects of the present invention are set out in the accompanying independent and dependent claims. It will be appreciated that features of the dependent claims may be combined with features of the independent claims in combinations other than those explicitly set out in the claims.

The following numbered clauses provide further example aspects and features of the present invention:

1. A base station for communicating data with at least one terminal in a wireless telecommunications system using a first plurality of Orthogonal Frequency Division Multiplex, OFDM, sub-carriers spanning a first frequency bandwidth, at least one of said subcarriers being an unused centre frequency for the first frequency bandwidth, the base station being configured:

to detect the bandwidth status of a receiver of the terminal;

to assign a centre frequency for a virtual channel in accordance with said detected bandwidth status, the virtual channel being a group of sub-carriers selected from said first plurality of OFDM sub-carriers and spanning a second frequency bandwidth, said second frequency bandwidth being substantially narrower than the first frequency bandwidth;

to allocate at least one unused subcarrier to said assigned centre frequency; and to communicate user-plane data with the terminal using the virtual channel 2. A base station according to clause 1, wherein, if the terminal is determined to have a first bandwidth status, first bandwidth status representing an indication that the terminal has a receiver that can receive radio frequency, RF, signals over the first frequency bandwidth and baseband signals over the second frequency bandwidth, the centre frequency for the virtual channel is assigned to a frequency substantially distinct from the centre frequency for the first frequency bandwidth and the at least one unused subcarrier allocated to the assigned centre frequency is the unused centre frequency for the first frequency bandwidth.

3. A base station according to clause 1 or 2, wherein, if the terminal is determined to have a second bandwidth status, second bandwidth status representing an indication that the terminal has a receiver that can receive radio frequency, RF, signals and baseband signals over the second frequency bandwidth, the centre frequency for the virtual channel is assigned to the centre frequency for the first frequency bandwidth and the at least one unused subcarrier allocated to the assigned centre frequency is the unused centre frequency for the first frequency bandwidth.

4. A base station according to any of clauses 1 to 3, the base station including a capacity monitoring unit for determining the level of data traffic on virtual channels, and in the case where both the level of data traffic in the virtual channel is determined to exceed a capacity threshold level and the terminal is determined to have a second bandwidth status, second bandwidth status representing an indication that the terminal has a receiver that can receive radio frequency, RF, signals and baseband signals over the second frequency bandwidth, the centre frequency for the virtual channel is assigned to a frequency substantially distinct from the centre frequency for the first frequency bandwidth, the base station is further configured to designate the assigned centre frequency as an unused centre frequency for the virtual channel; and the at least one unused subcarrier allocated to the assigned centre frequency is the designated unused centre frequency.

5. A base station according to any of clauses 1 to 4, wherein the bandwidth status represents an indication of a classification of receiver architecture selected from a group including: intermediate frequency conversion, direct conversion, normal narrowband and baseband narrowband.

6. A base station according to any preceding clause, wherein the bandwidth status corresponds to at least one parameter characterising the bandwidth size capability of the receiver.

7. A method for communicating data with at least one terminal in a wireless telecommunications system using a plurality of Orthogonal Frequency Division Multiplex, OFDM, sub-carriers spanning a first frequency bandwidth, at least one of said subcarriers being an unused centre frequency for the first frequency bandwidth, the method comprising:

detecting the bandwidth status of a receiver of the terminal;

assigning a centre frequency for a virtual channel in accordance with said detected bandwidth status, the virtual channel being a group of sub-carriers selected from said plurality of OFDM sub-carriers and spanning a second frequency bandwidth, said second frequency bandwidth being substantially narrower than the first frequency bandwidth;

allocating at least one unused subcarrier to said assigned centre frequency; and communicating user-plane data with the terminal using the virtual channel 8. A method according to clause 7, wherein, if the terminal is determined to have a first bandwidth status, the centre frequency for the virtual channel is assigned to a frequency substantially distinct from the centre frequency for the first frequency bandwidth and the at least one unused subcarrier allocated to the assigned centre frequency is the unused centre frequency for the first frequency bandwidth.

9. A method according to clause 7 or 8, wherein, if the terminal is determined to have a second bandwidth status, the centre frequency for the virtual channel is assigned to the centre frequency for the first frequency bandwidth and the at least one unused subcarrier allocated to the assigned centre frequency is the unused centre frequency for the first frequency bandwidth.

10. A method according to any of clauses 7 to 9, further comprising:

determining the level of data traffic on virtual channels, and in the case where both the level of data traffic in the virtual channel is determined to exceed a capacity threshold level and the terminal is determined to have a second bandwidth status, the centre frequency for the virtual channel is assigned to a frequency substantially distinct from the centre frequency for the first frequency bandwidth, and the method further comprising:

designating the assigned centre frequency as an unused centre frequency for the virtual channel, wherein the step of allocating at least one unused subcarrier to said assigned centre frequency comprises allocating the designated unused centre frequency to the assigned centre frequency.

11. A method according to any of clauses 7 to 10, wherein the bandwidth status is a classification of terminal receiver architecture selected from a group including: intermediate frequency conversion, direct conversion, normal narrowband and baseband narrowband.

12. A method according to any of clauses 7 to 11, wherein the bandwidth status corresponds to at least one parameter characterising the bandwidth size capability of the terminal receiver.

13. A base station for communicating data with at least one MTC-type terminal device in a wireless telecommunications system using at least one of a plurality of Orthogonal Frequency Division Multiplex, OFDM, sub-carriers spanning a first frequency bandwidth, at least one of said subcarriers being a first unused subcarrier, the base station comprising:

a resource management unit adapted to select a centre frequency for a virtual channel, the virtual channel being a resource group selected from the plurality of sub-carriers to which communications between the at least one MTC-type device and the base station are allocated and the virtual channel having a centre frequency.

14. A base station according to clause 13, further comprising a scheduler adapted to allocate a second unused subcarrier at the selected centre frequency for the virtual channel 15. A base station according to clause 13, further comprising:

a capability detection unit adapted to detect the bandwidth status of a receiver of the device and a scheduler adapted to allocate at least one unused subcarrier to the selected centre frequency for the virtual channel, wherein, if the MTC-type device is determined to have a first bandwidth status, the resource management unit is adapted to select a frequency substantially distinct from the centre frequency for the first frequency bandwidth as the centre frequency for the virtual channel, whereas, if the MTC-type device is determined to have a second bandwidth status different from the first bandwidth status, the resource management unit is adapted to select the centre frequency for the first frequency bandwidth as the centre frequency for the virtual channel, and wherein the scheduler is adapted to allocate the first unused subcarrier for the first frequency bandwidth to be used as the at least one unused subcarrier allocated to the selected centre frequency.

16. A base station according to clause 15, further including a capacity monitoring unit for determining the level of data traffic on virtual channels, and in the case where both the level of data traffic in the virtual channel is determined to exceed a capacity threshold level and the device is determined to have a second bandwidth status, the resource management unit is adapted to select a frequency substantially distinct from the centre frequency for the first frequency bandwidth as the centre frequency for the virtual channel; and the scheduler is further configured to designate the selected centre frequency as an unused centre frequency for the virtual channel

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] DCoffset primer {http://venividiwiki.ee.virginia.edu/mediawiki/images/9/93/DCR_Raman.pdf}
[11] UK patent application GB 1113801.3

The invention claimed is:

1. A base station for communicating data with a terminal in a wireless telecommunications system using a plurality of Orthogonal Frequency Division Multiplex (OFDM) sub-carriers spanning a first frequency bandwidth, at least one of said plurality of OFDM subcarriers being an unused centre frequency for the first frequency bandwidth, the base station comprising:

circuitry configured to
detect a bandwidth status of a receiver of the terminal;
determine a level of data traffic in a virtual channel, the virtual channel being a group of sub-carriers selected from said plurality of OFDM sub-carriers and spanning a second frequency bandwidth, said second frequency bandwidth being substantially narrower than the first frequency bandwidth;
assign a centre frequency for the virtual channel in accordance with said detected bandwidth status;
allocate at least one unused subcarrier to said assigned centre frequency; and
communicate user-plane data with the terminal using the virtual channel, wherein
the circuitry assigns the centre frequency for the virtual channel to a frequency substantially distinct from a centre frequency for the first frequency bandwidth when both the level of data traffic in the virtual channel is determined to exceed a capacity threshold level and the terminal is determined to have a first bandwidth status, the first bandwidth status representing an indication that the receiver can receive radio frequency (RF) signals and baseband signals over the second frequency bandwidth.

2. The base station as claimed in claim 1, wherein when the circuitry detects that the terminal has a second bandwidth status, the second bandwidth status indicating that the receiver can receive RF signals over the first frequency bandwidth and baseband signals over the second frequency bandwidth, the circuitry is configured to assign the centre frequency for the virtual channel to the frequency substantially distinct from the centre frequency for the first frequency bandwidth and the at least one unused subcarrier is the unused centre frequency for the first frequency bandwidth.

3. The base station as claimed in claim 1, wherein when the circuitry detects that the terminal has the first bandwidth status, the circuitry is configured to assign the centre frequency for the virtual channel to the centre frequency for the first frequency bandwidth and the at least one unused subcarrier is the unused centre frequency for the first frequency bandwidth.

4. The base station as claimed in claim 1, wherein the circuitry is further configured to
designate the assigned centre frequency as an unused centre frequency for the virtual channel, the at least one unused subcarrier is the designated unused centre frequency.

5. The base station as claimed in claim 1, wherein
the bandwidth status indicating a classification of receiver architecture of the receiver, and
the receiver architecture is selected from a group including intermediate frequency conversion, direct conversion, normal narrowband and baseband narrowband.

6. The base station as claimed in claim 1, wherein the bandwidth status corresponds to at least one parameter characterising a bandwidth size capability of the receiver.

7. A method for communicating data by a base station with a terminal in a wireless telecommunications system using a plurality of Orthogonal Frequency Division Multiplex (OFDM) sub-carriers spanning a first frequency bandwidth, at least one of said plurality of OFDM subcarriers being an unused centre frequency for the first frequency bandwidth, the method comprising:

detecting bandwidth status of a receiver of the terminal, the bandwidth status indicating a classification of receiver architecture of the receiver;
determining, by circuitry of the base station, a level of data traffic in a virtual channel, the virtual channel being a group of sub-carriers selected from said plurality of OFDM sub-carriers and spanning a second frequency bandwidth, said second frequency bandwidth being substantially narrower than the first frequency bandwidth;
assigning, by the circuitry, a centre frequency for the virtual channel in accordance with said detected bandwidth status;
allocating at least one unused subcarrier to said assigned centre frequency; and
communicating user-plane data with the terminal using the virtual channel, wherein
in the assigning, the centre frequency for the virtual channel is assigned to a frequency substantially distinct from a centre frequency for the first frequency bandwidth when both the level of data traffic in the virtual channel is determined to exceed a capacity threshold level and the terminal is determined to have a first bandwidth status, the first bandwidth status representing an indication that the receiver can receive radio frequency (RF) signals and baseband signals over the second frequency bandwidth.

8. The method as claimed in claim 7, further comprising:
assigning, by the circuitry when the terminal is determined to have a first second bandwidth status indicating that the receiver can receive RF signals over the first frequency bandwidth and baseband signals over the second frequency bandwidth, the centre frequency for the virtual channel to the frequency substantially distinct from the centre frequency for the first frequency bandwidth and the at least one unused subcarrier is the unused centre frequency for the first frequency bandwidth.

9. The method as claimed in claim 7, further comprising: assigning, by the circuitry when the terminal is determined to have the second bandwidth status, the centre frequency for the virtual channel to the centre frequency for the first frequency bandwidth and the at least one unused subcarrier is the unused centre frequency for the first frequency bandwidth.

10. The method as claimed in claim 7, further comprising: designating the assigned centre frequency as an unused centre frequency for the virtual channel, the at least one unused subcarrier is the designated unused centre frequency.

11. The method as claimed in claim 7, wherein the receiver architecture is selected from a group including intermediate frequency conversion, direct conversion, normal narrowband and baseband narrowband.

12. The method as claimed in claim 7, wherein the bandwidth status corresponds to at least one parameter characterising a bandwidth size capability of the terminal receiver.

13. A base station for communicating data with a machine type communication (MTC-type) device in a wireless telecommunications system using at least one of a plurality of Orthogonal Frequency Division Multiplex (OFDM) subcarriers spanning a first frequency bandwidth, at least one of said plurality of OFDM subcarriers being a first unused subcarrier, the base station comprising:
circuitry configured to
detect a bandwidth status of a receiver of the MTC-type device;
determine a level of data traffic in a virtual channel, the virtual channel being a resource group of sub-carriers selected from the plurality of OFDM sub-carriers to which communications between the MTC-type device and the base station are allocated and the virtual channel having the centre frequency; and
select a centre frequency for a virtual channel, wherein the circuitry selects a frequency substantially distinct from the centre frequency for the first frequency bandwidth as the centre frequency for the virtual channel when both the level of data traffic in the virtual channel is determined to exceed a capacity threshold level and the MTC-type device is determined to have a first bandwidth status.

14. The base station as claimed in claim 13, wherein the circuitry is further configured to allocate a second unused subcarrier at the selected centre frequency for the virtual channel.

15. The base station as claimed in claim 13, wherein the circuitry is further configured to
allocate at least one unused subcarrier to the selected centre frequency for the virtual channel;
select, when the MTC-type device is determined to have a second bandwidth status different from the first bandwidth status, the frequency substantially distinct from the centre frequency for the first frequency bandwidth as the centre frequency for the virtual channel;
select, when the MTC-type device is determined to have the first bandwidth status, the centre frequency for the first frequency bandwidth as the centre frequency for the virtual channel; and
allocate the first unused subcarrier for the first frequency bandwidth to be used as the at least one unused subcarrier allocated to the selected centre frequency.

16. The base station as claimed in claim 15, wherein the circuitry is further configured to
designate the selected centre frequency as an unused centre frequency for the virtual channel when both the level of data traffic in the virtual channel is determined to exceed the capacity threshold level and the MTC-type device is determined to have the first bandwidth status.

17. The base station as claimed in claim 13, wherein the circuitry is further configured to
assign the centre frequency for the virtual channel to the frequency substantially distinct from the centre frequency for the first frequency bandwidth when both the level of data traffic in the virtual channel is determined to exceed the capacity threshold level and the MTC-type device is determined to have the first bandwidth status, the first bandwidth status representing an indication that the MTC-type device can receive radio frequency (RF) signals and baseband signals over the second frequency bandwidth; and
designate the assigned centre frequency as an unused centre frequency for the virtual channel, the first unused subcarrier being the designated unused centre frequency.

18. The base station as claimed in claim 13, wherein
the bandwidth status indicating a classification of receiver architecture of the receiver, and
the receiver architecture is selected from a group including intermediate frequency conversion, direct conversion, normal narrowband and baseband narrowband.

19. The base station as claimed in claim 13, wherein the bandwidth status corresponds to at least one parameter characterising a bandwidth size capability of the MTC-type device.

* * * * *